United States Patent [19]

Begur et al.

[11] Patent Number: 5,784,649
[45] Date of Patent: Jul. 21, 1998

[54] MULTI-THREADED FIFO POOL BUFFER AND BUS TRANSFER CONTROL SYSTEM

[75] Inventors: Sridhar Begur, San Jose; James K. Gifford, Danville; Adrian Lewis, Fremont; Donald J. Spencer, San Jose; Thomas E. Kilbourn; Daniel B. Gochnauer, both of Saratoga, all of Calif.

[73] Assignee: Diamond MultiMedia Systems, Inc., San Jose, Calif.

[21] Appl. No.: 614,659

[22] Filed: Mar. 13, 1996

[51] Int. Cl.$^6$ .................................................. G06F 13/00
[52] U.S. Cl. .................... 395/872; 395/200.61; 395/309
[58] Field of Search ............................ 395/290, 308, 395/309, 250, 200.05, 872, 877, 200.61, 200.62, 200.63

[56] References Cited

U.S. PATENT DOCUMENTS

| | | | |
|---|---|---|---|
| 4,509,119 | 4/1985 | Gumaer et al. | 364/200 |
| 4,935,894 | 6/1990 | Ternes et al. | 364/900 |
| 5,161,215 | 11/1992 | Kouda et al. | 395/250 |
| 5,299,313 | 3/1994 | Petersen et al. | 395/200 |
| 5,317,692 | 5/1994 | Ashton et al. | 395/200 |
| 5,428,609 | 6/1995 | Eng et al. | 370/60.1 |
| 5,488,694 | 1/1996 | McKee et al. | 395/824 |
| 5,488,724 | 1/1996 | Firoozmand | 395/200.07 |
| 5,530,871 | 6/1996 | Abe | 395/732 |
| 5,586,264 | 12/1996 | Belknap et al. | 395/200.08 |

*Primary Examiner*—Ayaz R. Sheikh
*Assistant Examiner*—Jigar Pancholi
*Attorney, Agent, or Firm*—Fliesler, Dubb, Meyer & Lovejoy, LLP

[57] ABSTRACT

A bus transfer control system manages the transfer of multiple asynchronous data streams through a buffer pool. The bus transfer control system includes a buffer pool having a plurality of memory blocks, wherein each memory block provides for the storage of a plurality of data bytes and a plurality of data transfer devices coupled to the buffer pool to allow the transfer of segments of one or more data streams to be transferred between the plurality of data tranfer devices through the buffer pool. A transfer controller maintains status information relating to the status of data in the memory blocks and includes control logic for repeatedly evaluating the status information and providing for the prioritied selection of a first data transfer device and a predetermined one of the memory blocks.

12 Claims, 8 Drawing Sheets

Fig. 4
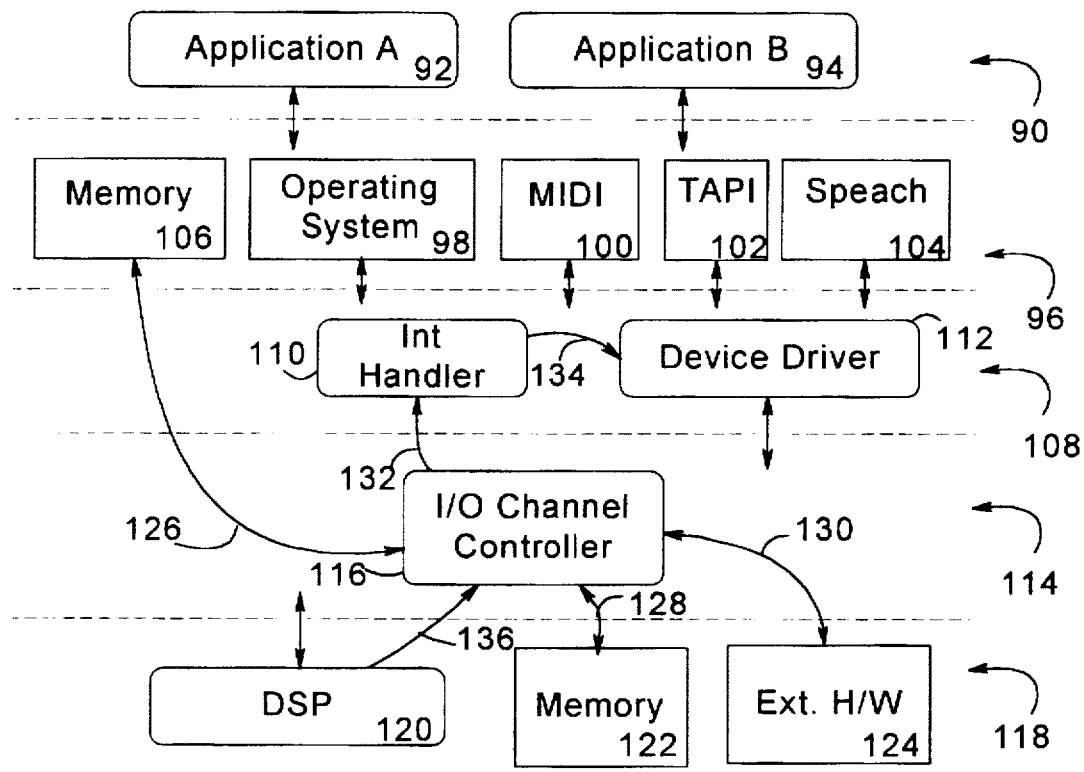
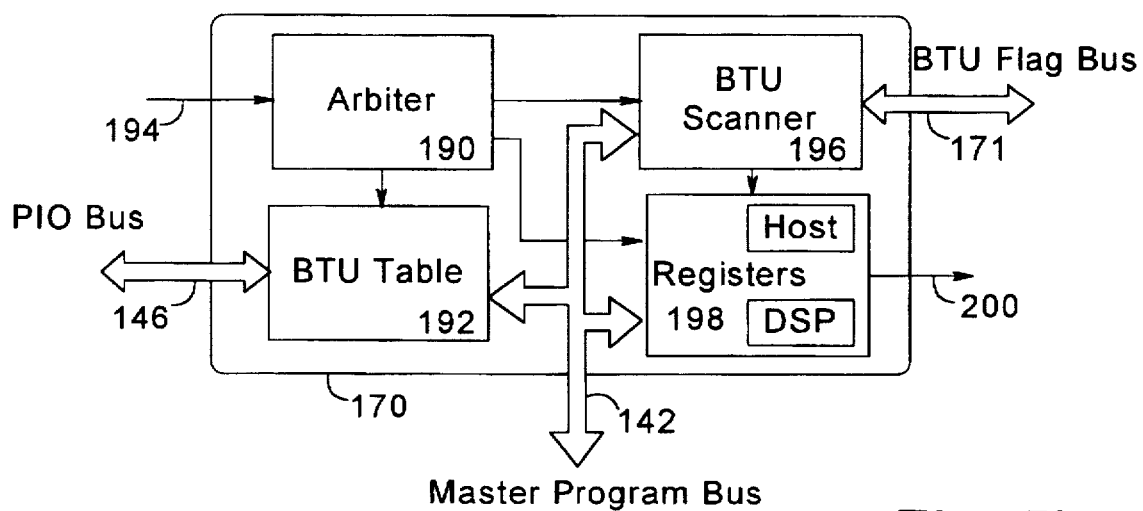
Fig. 5b

MULTI-THREADED FIFO POOL BUFFER AND BUS TRANSFER CONTROL SYSTEM

CROSS-REFERENCE TO RELATED APPLICATIONS

The present application is related to the following Applications, all assigned to the Assignee of the present Application:

1. Multiple Parallel Digital Data Stream Channel Controller, invented by Gifford, et al., Our ref.: DIAM 3000 GBR, application Ser. No. 08/614,729, filed Mar. 13, 1996.

2. Distributed Status Signaling System for Multi-threaded Data Stream Transport Control, invented by Lewis, et al, Our ref.: DIAM3005GBR, application Ser. No. 08/596,921, filed Mar. 13, 1996.

3. Method and Apparatus Supporting Demand Driven Multiple Parallel Digital Data Stream Transport, invented by Spencer, et al., Our ref.: DIAM3011GBR, application Ser. No. 08/615,682, filed Mar. 13, 1996.

BACKGROUND OF THE INVENTION

1. Field of the Invention

The present invention is generally related to high-performance peripheral data interfaces and, in particular, to a multi-threaded, bus-mastering, input/output (I/O) channel controller architecture applicable to general purpose personal computers, computer workstations, and embedded communications and network data routing and conversion functions.

2. Description of the Related Art

The continuing development of typically multimedia, network and communications oriented applications for personal computers and computer workstations is fundamentally dependant on performing computationally intensive operations on high data throughput digital data streams. Typically required computationally intensive operations include three dimensional (3D) audio generation and manipulation, wavetable based audio synthesis, V.34 protocol serial data signal generation and detection, and analog speech filtering and compression These operations, if implemented in software, will conventionally consume between 20 and 40 million instruction cycles per second each (MIPS) when performed by the main or host processor of the personal computer or workstation system. In addition, supporting the associated high throughput data stream transfer to conventional peripheral coder/decoder chips (CODECs) will consume an additional one to two MIPS per digital data transfer stream.

However, conventional microprocessors found in personal computer and workstation systems are generally capable of upwards of only 60 MIPS sustained, and more typically 20 to 30 MIPS. Context switches, memory management, and peripheral wait states further operate to constrain the effective MIPS available to computationally process and transport digital data streams. Since, as a practical matter, significant host processor MIPS must be reserved for the execution of typically end-user applications concurrent with the performance of multimedia functions, the need for peripheral hardware support in processing digital data streams has been generally acknowledged.

In adding peripheral hardware support for multimedia, network and communications applications, both hardware and software interface considerations need to be addressed. Any peripheral hardware used needs to be cost effective in adding computational functions without, in turn, burdening the host processor with hardware service requirements. Any added support burden directly compromises the net effective MIPS gain obtained through the addition of the peripheral hardware.

Similarly, the software interface to the peripheral hardware needs to efficiently interface with the operating system executed by the host processor to enable effective sustained use of the peripheral hardware. An ineffective software interface results in an increased MIPS commitment by the host processor to communicate with the peripheral hardware. Again, any increased processing burden due to complexities in managing the software interface to the peripheral hardware results in a direct reduction in the effective sustained processing MIPS obtained by use of the peripheral hardware.

Conventional approaches to providing peripheral hardware support for multimedia, network and communications applications include providing various combinations of dedicated integrated circuits (chips) implementing substantially hardwired or only partially configuration programmable computational functions and highly software programmable digital signal processors (DSPs). Dedicated function chips typically implement a limited signal processing function or small set of related functions in a low cost tightly packaged form. The supported functions are typically of specific functional scope and programmability is mostly restricted to initial configuration options and modest, if any, dynamic controls.

As a hardware peripheral, dedicated function chips typically provide little or no direct support for managing continuous real-time signal processing of digital data streams, let alone support for multiple data stream transport. Such chips typically act as mere consumers or producers (sources or sinks) of a digital data stream that is pulled from or pushed to the chips at the available maximum or some desired rate determined by the host processor. Consequently, peripheral hardware utilizing dedicated function chips is subject to conventional data stream transfer interruptions and transport speed limitations due to, for example, excessive host processor interrupts, context switching, and various memory management kernel processing, as well as a fundamental competition for host processor CPU cycles with other applications being concurrently executed by the host processor. System wide competition or limited system hardware support for multiple logically concurrent direct memory access (DMA) data transfers will also reduce sustained data transfer rates to a dedicated function chip. Furthermore, the typically single stream nature of dedicated function chips directly requires a substantial involvement by the host processor in performing data stream initialization, transport control and any required data stream mixing or multiplexing operations. Consequently, while dedicated function chips can provide a significant increase in the multimedia and digital signal processing capabilities of a personal computer or workstation system, a substantial and generally unbounded processing burden remains with the host processor.

General purpose digital signal processors have been implemented in peripheral hardware systems particularly where complex and high speed signal processing computations are required. Conventional DSP chips are capable of providing upwards of 50 MIPS in a computational architecture well suited for data stream processing. In general, such DSP chips are relatively expensive and require relatively intensive software development programs to implement the software algorithms needed to perform their intended functions. However, DSP chip architectures are generally not optimized for controlling extended data transfer operations or memory management functions. Rather, the architectures are typically optimized to read, process, and write data with respect to internal dedicated memory and external locally connected memory or directly connected dedicated function peripheral chips. Consequently, the host processor must again be substantially involved in data transfers to the memory space of a DSP implemented as peripheral hardware. Unfortunately, this generally results in the DSP being subject to the same limitations on the obtainable and sustainable performance of the host processor as in the case of dedicated function chips.

In order to bound interruptions in the transfer of data to multimedia peripheral hardware, and thereby improve the sustainable data transfer rate obtainable from a host processors, a conventional operating system executed by the host processor may be augmented with a small, preemptive real-time kernel, such as SPOX. This kernel can be implemented as a low-level device driver supporting the real-time interrupt and data transfer requirements of the multimedia peripheral hardware. While such a real-time kernel does tend to ensure execution of maximum sustained data transfers to and from the DSP memory space, the host processor incurs the same substantial overhead of managing the data stream transfers as well as the additional execution overhead of the real-time kernel itself.

Consequently, present multimedia, network and communications peripheral hardware subsystems implemented typically for personal computers and workstation systems do not well address the need to efficiently provide additional processing capability through the addition of the peripheral hardware.

Various host based signal processing architectures, such as native signal processing (NSP) and Direct-X, have been proposed and largely defined to address, among several objectives, the requirement that a well formed software interface be provided to the operating system for multimedia, network and related communications operations. A host based signal processing architecture relies on the specific use of the host processor itself to perform at least high level signal processing functions. Such architectures have at least two immediate benefits. The first benefit is that, by significantly processing data streams before transport ultimately to peripheral hardware, the data streams are mixed, multiplexed or computationally reduced to lighten the processing overhead involved in the data transport to the peripheral hardware. Thus, the effective processing performance of the personal computer or workstation system may be slightly to significantly improved The second benefit is that a potentially comprehensive application programming interface (API) is presented to the operating system, thereby tending to virtualize particular implementations of the physical and functional peripheral hardware Multimedia, network and related communications applications can therefore effectively assume broader or simply different support for desired functions than actually provided by any particular implementation of peripheral hardware. Where direct support for a particular function is not directly provided by a particular instance of the peripheral hardware, the function is performed in software by the host processor, executing as the host based signal processor, down to a functional level that is supported by the particular instance of the peripheral hardware.

While host based signal processing can increase the efficiency of the personal computer or workstation system in performing multimedia, network and communications functions, many of the functions supported by host based signal processing are still quite computationally intensive. Thus, host based signal processing represents a most direct burden on the host processor. Furthermore, while host based signal processing does have the potential for significantly reducing the volume of data transported to or from the peripheral hardware, as a practical matter the computational burden on the host processor will not be substantially affected and, in any event, will remain quite significant.

SUMMARY OF THE INVENTION

Thus, a general purpose of the present invention is to provide a peripheral I/O controller supporting multiple, parallel variable bandwidth data streams over a high total bandwidth data transfer path established between a central processor and multiple multimedia, network and communications related peripheral devices.

This is achieved in the present invention through a bus transfer control system managing the transfer of multiple asynchronous data streams through a buffer pool. The bus transfer control system includes a buffer pool having a plurality of memory blocks, wherein each memory block provides for the storage of a plurality of data bytes and a plurality of data transfer devices coupled to the buffer pool to allow the transfer of segments of one or more data streams to be transferred between the plurality of data transfer devices through the buffer pool. A transfer controller maintains status information relating to the status of data in the memory blocks and includes control logic for repeatedly evaluating the status information and providing for the prioritied selection of a first data transfer device and a predetermined one of the memory blocks.

A computer system utilizing the multiple parallel digital data stream channel controller of the present invention can thus support the concurrent real-time transfer of a plurality of I/O data streams to and from an auxiliary data processing unit. The computer system can include a first processing unit including a first memory providing for the storage of a plurality of data streams characterized as each having a respective data transfer rate, a second processing unit providing for the manipulation of data within data segments of the plurality of data streams, and the channel controller coupled between the first and second processing units to provide for the transfer of the plurality of data streams between the first and second processors. The channel controller provides for the selective transfer of data segments of the plurality of data streams based on the respective data transfer rates of the data streams.

Thus, an advantage of the present invention is that it provides a dynamically allocated multi-channel control interface to a host processor system that, in turn, permits flexible programmability and control over the operation of the channel controller.

Another advantage of the present invention is that it minimizes host processor performance loading by performing substantial autonomous data transfer functions and dynamic flow management. The channel controller supports internal interrupt management that minimizes both host and DSP interrupt support burdens, thereby enabling and supporting real-time multiple parallel channel signal processing through a comprehensive interrupt source managed data stream channel connecting the host with auxiliary signal processing units.

A further advantage of the present invention is that it provides for the dynamic buffer sized, rate-controlled flow of multiple streams of data through the channel controller, optimally utilizing the maximum available peripheral I/O channel data bandwidth. Stream transfers are independent of stream data type. Each of the data stream channels of the channel controller exist as logically independent channels. The channels can be serially combined to provide discrete data routing paths through additional or on-board signal-processing circuitry as well as external peripheral signal processing units.

Still another advantage of the present invention is that the provided autonomous bus master operation removes the requirement for conventional direct memory access operation as well as host processor involvement in data transfers through the I/O channel controller. Interleaved transfer of segments of data streams enables the effectively concurrent parallel transfers of digital data streams to and through the channel controller. This substantially alleviates the need for host application context switches and most host user to interrupt kernel mode switches while providing real-time transport support for multiple concurrent data streams.

A yet further advantage of the present invention is that it provides dynamic support of variable rate real-time time signal processing by ensuring effectively continuous flows of data between data sources and sinks at the dynamic data rate established by the stream peripheral for each data transfer channel.

Yet still another advantage of the present invention is that it provides readily extensible support for auxiliary signal processing units including units that are fully programmable and others that provide only partially or even fully hardware implemented functions.

A still further advantage of the present invention is that the channel controller is programmable as a composite function peripheral that effectively moderates computer system cost by greatly expanding the independent and cooperative signal processing functionality of data intensive peripheral subsystems.

BRIEF DESCRIPTION OF THE DRAWINGS

These and other advantages and features of the present invention will become better understood upon consideration of the following detailed description of the invention when considered in connection of the accompanying drawings, in which like reference numerals designate like parts throughout the figures thereof, and wherein:

FIG. 4 is a diagrammatic illustration of the high level control and physical data flow supported by an I/O channel controller consistent with the present invention established in relation to an operating system;

FIG. 5b is a detailed block diagram of a preferred embodiment of a bus transfer control system of the present invention;

DETAILED DESCRIPTION OF THE INVENTION

I. I/O Controller System Architecture

Figures 1A, 1B:
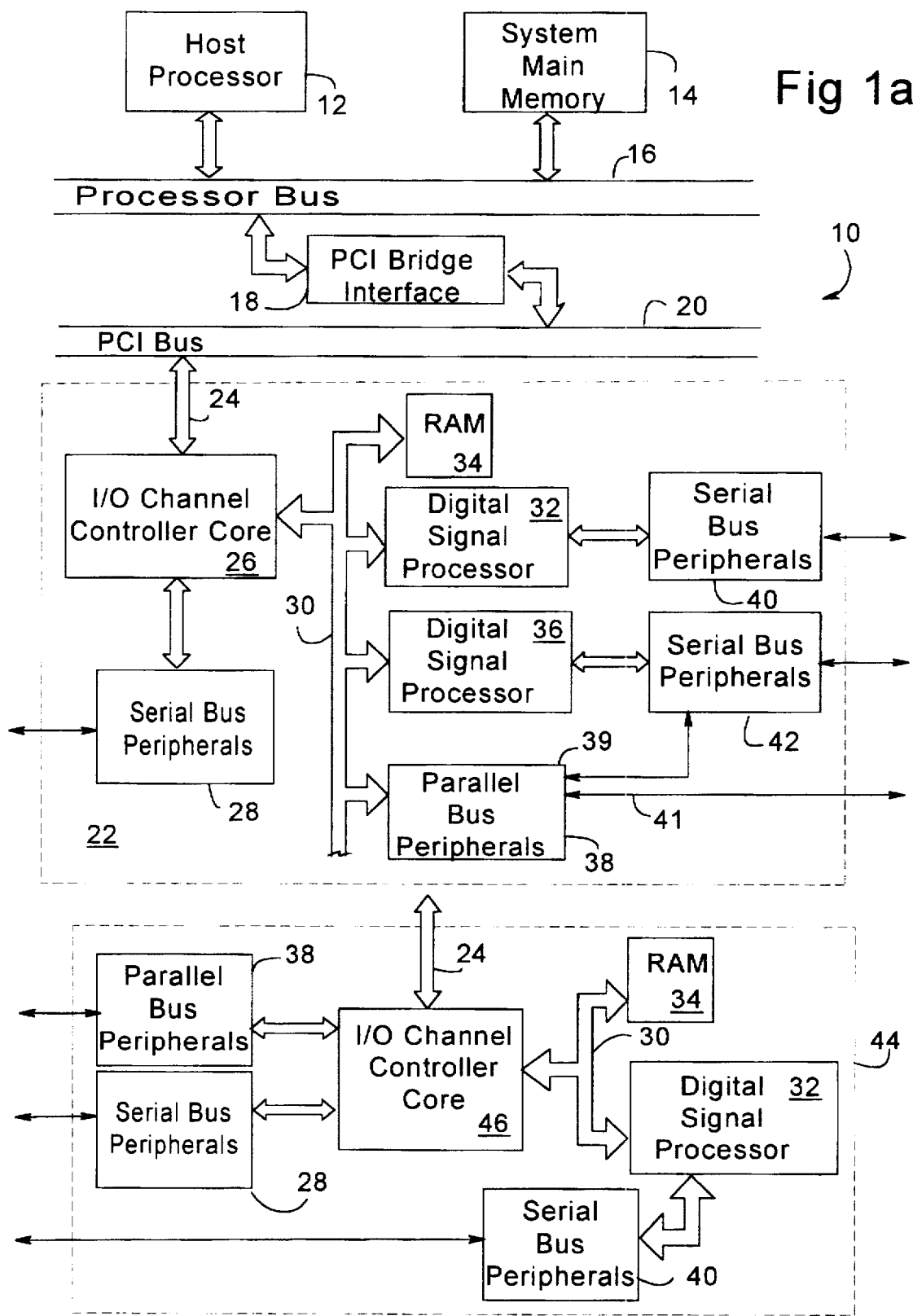
FIG. 1a is a block diagram of a personal computer type system implementing a first embodiment of the I/O channel controller sub-system consistent with the present invention.
FIG. 1b is a block diagram of an I/O channel controller sub-system consistent with a second embodiment of the present invention.

FIG. 1a provides a block diagram of a computer system 10, preferably implementing a personal computer architecture, that is coupled to a multi-function I/O peripheral controller hardware system (I/O channel controller) 22. A host processor 12, typically an Intel® Pentium® CPU, Motorola PowerPC® CPU, or the like, is coupled to a system main memory 14 via a processor bus 16. A conventional peripheral component interconnect (PCI) bridge interface 18 provides a high performance data and control connection between the processor bus 16 and a mezzanine PCI bus 20. The multi-function peripheral system 22 is coupled to the PCI bus 20 through a conventional PCI adapter bus connector 24. An I/O channel controller core 26 that is centrally responsible for managing data and control signal transfers with respect to the PCI bus 20 is also coupled to the adapter bus 24. The I/O channel controller core 26 operates as a substantially autonomous bus master peripheral controller supporting multiple concurrent data and control signal transfers between the PCI bus 20 and system 22. These concurrent transfers are preferably managed as independent pairs of data streams and control threads of execution where each stream is composed of discrete block transfers, consisting of one or more bytes of data, through the I/O channel controller 26. Data blocks of concurrently supported streams are interleaved among one another to effectively establish concurrent stream data transport.

In accordance with the present invention, the interleave of data blocks is determined by the controller sub-system 22 and, in general, independent of the execution of the host processor 12. The interleave of data blocks implemented by the I/O channel controller core 26 reflects the respective demand transport rates of the individual data streams as determined from the nature of the stream data transported. Consequently, where stream data represents a constant data frequency audio signal stream, the interleave of data blocks in the audio data stream may vary, though generally maintaining a fixed through-put rate reflective of the data stream transfer rate independently demanded by an audio stream coder/decoder (CODEC). Where the demanded data rate is not a constant, such as where variable rate audio or video compression is utilized, the data block interleave may further vary though again in accordance with the demanded data transfer rate appropriate for the compressed data stream.

In a preferred embodiment of the present invention, the I/O channel controller core 26 supports a number of directly connected serial bus peripherals 28. These serial bus peripherals 28 preferably include dedicated function chips that implement specific high speed, typically serially oriented data transport functions. A typical serial bus peripheral 28 includes a dedicated function chip providing high speed serial universal synchronous/asynchronous rate transfer (USART) function. Another possible serial bus peripheral 28 may implement a dedicated function chip set providing a low-cost hardware based audio sub-system.

The I/O channel controller core 26 also preferably provides a high speed, general data and control bus 30 in support of a wide range of data processing and transport peripherals. One or more digital signal processors (DSPs) 32, 36 and associated DSP RAM 34 can be attached to the bus 30 to provide high performance computational support for indirectly attached peripherals, such as the serial bus peripherals 28, a parallel bus peripheral 38 and the host processor 12. Although dependant on the particular implementation of the DSPs 32, 36, the DSP RAM 34 preferably exists internal to the DSPs 32, 36 and is mapped into an common address space accessible by the bus 30. The DSPs 32, 36 preferably also provide interface control support for directly connected peripherals, such as the serial bus peripherals 40, 42.

The DSPs 32, 36 permit a variety of different computational and control functions to be performed generally independently and in-parallel with respect to one another. Thus, for example, the digital signal processor 32 may implement a range of signal processing functions as appropriate to support a variety of telecommunications specific serial bus peripherals 40 Such a digital signal processor 32 can implement signal processing algorithms that perform the protocol and signal processing necessary to implement a high speed fax modem, an integrated services digital network (ISDN) connection, and a wireless data transceiver systems. The serial bus peripherals 40 directly connected to the digital signal processor 32 can appropriately include a plain old telephone system (POTS) interface, an ISDN interface and a low-power FCC compliant RF or IR data transceiver.

A second digital signal processor 36 can independently or cooperatively provide audio and video signal processing functions including 3D audio synthesis, wavetable based audio signal generation and mixing, speech and music reproduction, and speech recognition. The serial bus peripherals 42 directly connected to the digital signal processor 36 may then include appropriate CODECs and filters for performing high speed bi-directional digital-to-analog signal conversions.

Parallel bus peripherals 38 are preferably connected directly to the bus 30 to support high speed parallel functions. The supported parallel function may include conventional high speed bi-directional parallel data transfers, a high-speed Ethernet-type network interface, as well as conventional EIDE and SCSI interfaces to conventional disk drives, CD-ROM drives, and the like. The parallel bus peripherals 30 may also include a direct or indirect interface through a video controller to the frame buffer of a video display controller. An additional function of the parallel bus peripherals is to provide a simple parallel/serial conversion function via one or more serial control lines 41 connected directly to a CODEC that is otherwise supported as a directly connected serial bus peripheral 42. As a practical matter, the serial connection 41 permits relatively direct control access to the CODEC by either the other DSP 32 or more likely the host processor 12 through a pass through connection to the bus 30.

By the implementation of the I/O channel controller 26, contention for data transfers among the various serial and parallel bus peripherals 28, 38, 40, 42 and digital signal processors 32, 36 is minimized. The maximum data through-put supported by the multi-function peripheral system 22 is effectively limited foremost by the available data transport bandwidth between the PCI bus 20 and system memory 14.

A somewhat more practical limitation on the data through-put supportable by the peripheral system 22 is the computational performance available from the digital signal processors 32, 36. This limitation, however, can be overcome in a number of different ways including increasing the number of digital signal processors coupled to the bus 30 and distributing the computational load among the parallelled processors. Also, utilizing higher performance digital signal processors will provide greater computational through-put.

Referring now to FIG. 1b, an alternate preferred peripheral system 44 is shown. The I/O channel controller core 46 provides enhanced support for the digital signal processor 32 by further removing the digital signal processor 32 from the potentially time critical data transport path of the data streams flowing through the serial bus peripherals 28 and, potentially, the parallel bus peripherals 30. Thus, while the digital signal processor 32 may process a data stream coupled directly through the serial bus peripherals 40, utilizing the I/O channel controller core 46 itself to control all data transfers between the serial and parallel bus peripherals 28, 38 and the DSP RAM 34 removes many if not most of the memory management and repetitive data transport functions from the digital signal processor 32. The DSP 32 is, in turn, permitted to spend more time on computational operations rather than extended data transfer operations for which the digital signal processor 32 may not be optimally suited. Consequently, the digital signal processor 32 almost exclusively operates on data moved between the RAM 34 and digital signal processor 32 using simple memory load and store operations. The subsequent transfer of data processed by the digital signal processor 32 and stored in the RAM 34 is transported to the serial and parallel bus peripherals 28, 38 without requiring any significant additional processing by the digital signal processor 32.

Figure 2:
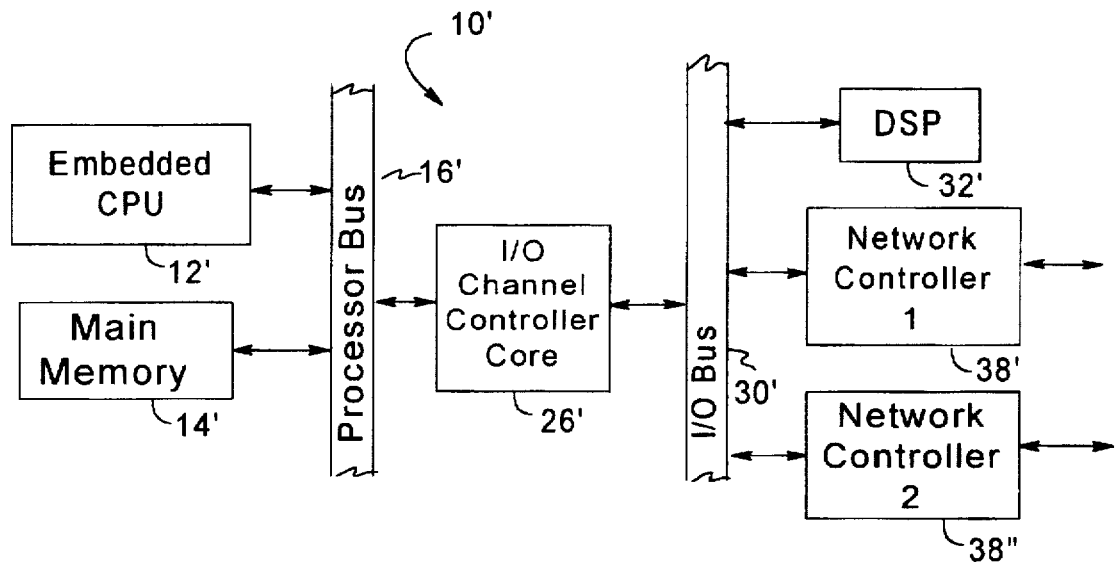
FIG. 2 is a block diagram of a dedicated function embedded I/O Channel, based system consistent with an alternate preferred embodiment of the present invention.

An embedded application of the present invention is shown in FIG. 2. The system 10' may operate as an intelligent stand-alone or remotely managed data stream processor. An embedded processor 12', such as an Intel 80196, and a main memory 14', preferably composed of a combination of DRAM and Flash EPROM, are inter-connected by a processor bus 16'. An I/O channel controller core 26' supports the transport of one or more potential overlapping data streams between the processor bus 16' and an I/O bus 30'. One or more DSPs 32' and any number of network peripherals, such as the network controllers 38', 38" are preferably attached to the I/O Bus 30'. The DSP 32' can directly service interrupts generated by the network controllers 38', 38" in support of their respective network data stream transport functions. The DSP may utilize the I/O channel controller to actually control the transport of data over the I/O bus 30' and, as desired, through to the main memory 14'.

In one preferred embedded embodiment, the embedded system 10' functions as an intelligent high-performance network data router. The embedded CPU 12' executes a control program provided in the Flash EPROM of the main memory 14' that supports conventional SNMP router management functions, and data gathering and diagnostic functions. The DSP 32' executes a control program from internal DSP memory that is either down-loaded from main memory 14' by the embedded CPU 12' or is provided in Flash EPROM in or associated with the DSP 32'. The DSP control program provides for the establishment and management of data routing and filtering trees within the DSP memory. As data packets are received by a network controller 38', source and destination packet data is passed to and processed by the DSP 32' against the routing and filter trees to determine whether and how to forward the packet. Both the DSP 32' and embedded CPU 12' may be employed to perform protocol conversions and provide for the implementation of security protocols as desired

II. Software System Architecture

Figure 3:
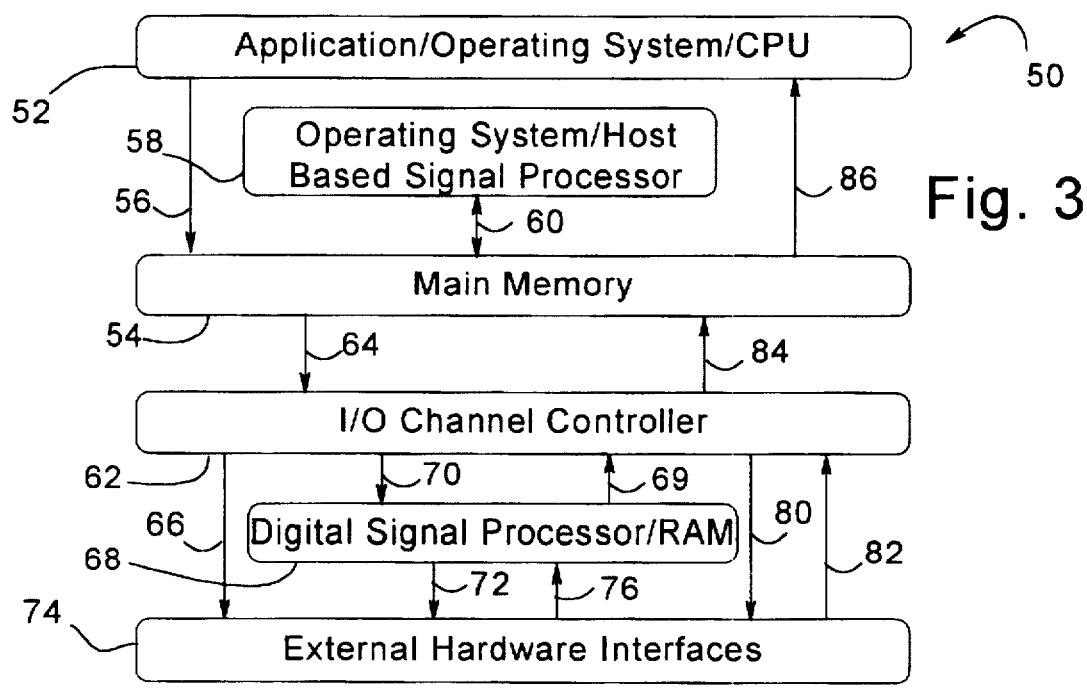
FIG. 3 is a diagrammatic illustration of the software architecture relationship of an I/O channel controller sub-system in relation with an operating system and multiple external hardware interfaces.

The operation of the I/O channel controller in terms of data flow as related to the major components of the computer system 10 is shown in the diagram 50 of FIG. 3. An outbound stream of data effectively originates with an application program executed in conjunction with an operating system by the host processor 12. The execution of an application within an application layer 52 results in a transfer of data 56 to a main memory storage space 54 within the memory 14. This data may be further manipulated under the direction of the application through the execution of the host processor 12 operating as a host-based signal processor. Thus, the data stream 60 may be iteratively transferred between the memory space 54 and the host signal processing layer 58. The particular signal processing actually performed by the host processor 12 is substantially determined by the various device drivers that together implement the full or available functionality of the particular implemented host based signal processor API (HBSP API). Directly or indirectly, HBSP API calls are eventually resolved to calls to an I/O channel controller device driver that initiates a data transfer control thread to transfer the data stream 64 from the main memory space 54 to the I/O channel controller core 62 for further transport and potential processing. Once the host processor 12, in executing the I/O channel controller device driver, has set up a control thread in the main memory space 54 defining the data stream transfer 64, the host processor 12 then operates to simply enable processing of the control thread on demand by the I/O channel controller 62. The I/O channel controller core 62 is thereafter responsible for actually performing the data stream transfer.

The host processor establishes a control thread in the main memory space 54 by constructing one or more linked bus transfer unit (BTU) control blocks to associate the stream data as provided in the main memory space 54 with the control thread. The host processor 12, in execution of the I/O channel controller device driver, initializes the I/O channel controller 62 with the initial BTU control block and programs certain configuration registers of the I/O channel controller 62 to configure the selection of a particular routing of the data stream through the I/O channel controller 62. Thereafter, the host processor 12 does not participate in the actual transfer of the data stream 64 to the I/O channel controller core 62. The data stream transfer is carried out under the direct control of the I/O channel controller core 62 as a bus master peripheral arbitrating with the host processor 12 for access to the main memory space 54. Consequently, the initiation and continued performance of multiple parallel data stream transfers to the I/O controller 62, as defined by respective control threads, are carried out effectively independent of one another and may be asynchronously initiated and completed by the I/O channel controller core 62.

Each bus transfer unit at least implicitly specifies the destination of an associated data stream. A data stream may be directed to the RAM memory space of a digital signal processor 68 or to a specific external hardware interface 74 of the various directly connected serial and parallel bus peripherals 28, 38. As a data stream 70 is processed by the digital signal processor 68, the resultant data 72 may be transferred to a directly connected external hardware interface 74 of a serial bus peripheral 40, 42. Alternately, resultant data may be stored back into the DSP RAM space. From the DSP RAM, the data stream 72 may be subsequently transferred again by the digital signal processor to any directly connected serial bus peripheral 40, 42.

Bus transfer unit control blocks that define a control thread for transferring the DSP RAM stored data stream 69, 80 can be provided in either system main or DSP memory 14, 34. Preferably, the DSP control thread bus transfer unit control blocks are established in system memory 14 by the host processor 12. Management of the DSP RAM 34 memory space is performed globally by the host processor 12 and thereby allows the DSPs 32, 36 to operate by definition independent of one another with respect to the use of the DSP RAM 34.

The DSP bus transfer unit control blocks are defined to control the transfer of one or more data streams through and under the control of the I/O channel controller core 62 to any of the external hardware interfaces 74 of the serial and parallel bus peripherals 28, 38 that are directly connected to the I/O channel controller 62. Alternately, the I/O channel controller core 62 may be directed to pass the processed datastream 84 back to the main memory space 54 potentially for further processing by the host based signal processor 58 or for use by an application 52.

The digital signal processor 68 and I/O channel controller core 62 receive inbound data streams 76, 82 from their directly connected external hardware interfaces 74. Where a data stream 76 is received directly by the digital signal processor 68, the data stream is preferably processed and stored to the DSP RAM 34. Subsequent transfers of the data so stored are coordinated by BTU control blocks provided preferably within the system main memory 14. This DSP BTU control thread directs the transfer of the data stream 69 to the I/O controller 62 for transfer as a stream 84 on to the main memory space 54 or to be redirected as a stream 80 to an the external hardware interface 74.

An inbound data stream 82 from an external hardware interface 74 connected directly to the I/O channel controller core 62 is redirected as a data stream 84 to the main memory space 54. Alternately, the data stream 82 may be directed as a stream 70 to the DSP RAM 34. In the latter instance, the data stream is typically processed by the digital signal processor 68 and provided either as a stream 72 directly to the external hardware interface 74 or as a stream 69 passed to the I/O channel controller 62 for return as a data stream 80 to an external hardware interface 74 or as a data stream 84 to the main memory space 54.

In general, an inbound data stream is ultimately routed to the main memory space 54. Once present in the main memory space 54, the data stream 60 may be further processed by the host based signal processor 58. Finally, a data stream 86 representing the fully processed inbound data stream maybe returned from the main memory space 54 by the operating system to an application program 52.

The data stream management system 50 of the present invention thus provides multiple data paths that may be flexibly defined and iteratively traversed to efficiently obtain a maximum processing of multiple effectively parallel data streams through an ordered combination or sub-combination of the host based signal processor 58, I/O channel controller 62, digital signal processor 68 and external hardware coupled through the external hardware interfaces 74.

Another view of the system 50, as shown in FIG. 4, illustrates the control and data flow paths established within the computer system 10 in accordance with the present invention. An application program layer 90 includes any number of co-executing applications 92, 94. These applications 92, 94 make application programming interface (API) calls into an operating system layer 96 that includes a base operating system 98 and operating extensions including, typically, MIDI 100, TAPI 102, and speech API 104 operating system extensions. Any number of additional or alternate APIs can be established within the operating system layer 96 consistent with, for example, the Direct-X API specification for Ring 3 operating system extensions. A memory block 106 is also shown as logically co-resident with the operating system 98 in the operating system layer 96 for convenience.

A device driver interface layer 108 includes the various Ring 0 device drivers needed to support the communications and data transfer between the operating system layer 96 and any components implemented as part of a peripheral layer 114. In particular, the device driver interface layer 108 includes an interrupt handler 110 and device driver 112 that provide, through execution by the host processor 12, support for an I/O channel controller 116 established within the peripheral controller layer 114.

Finally, in accordance with the present invention, a controller peripheral layer 118 is provided. This controller peripheral layer 118 includes generally a digital signal processor 120, a memory 122 accessible by the DSP 120 and dedicated function external hardware 124 potentially accessible by both the DSP 120 and I/O channel controller 116.

In a typical control flow, an Application A 92 establishes a data stream within the memory 106 through a conventional interaction with the operating system layer 96. As at least the initial portion of the data stream is constructed in the memory 106, the device driver 112 is called from the operating system layer 96 to prepare for a transfer of the data stream through the I/O channel controller 116 to the memory 122 or external hardware 124 of the controller peripheral layer 118. The device driver 112 establishes one or more BTU control blocks within the memory 106 defining a control thread necessary to implement the data stream transfer. The initial BTU of the control thread is programmed by the device driver 112 into the I/O channel controller 116 and a signal is provided to enable the operation of the I/O channel controller 116 with respect to the programmed BTU. The operation of the I/O channel controller 116 is, thereafter, substantially autonomous in completing the data stream transfer defined by the BTU programmed into the I/O channel controller 116 and any other BTUs in the memory 106 that are part of the control thread defining the data stream transfer.

Where the target of the data stream transfer is the memory 122, the device driver 112 will first establish another series of one or more BTU control blocks within the memory 106 to establish a control thread suitable for managing the DSP side transfer of a data stream. The initial BTU is programmed into the I/O channel controller 116 by the device driver 112. Next, the device driver 112 may post a command, specifying the desired function of the DSP, to the digital signal processor 120. Preferably, this command is posted through the use of programmed I/O (PIO) into one or more registers maintained by the I/O channel controller core 116 and readable by the digital signal processor 120 in response to a DSP interrupt signifying that a command message has been posted. In response to the posted command, the DSP 120 preferably initializes as necessary to perform the commanded function and then provides a signal 136 to the I/O channel controller 116 to enable the operation of the controller with respect to the pre-programmed BTU.

In response to having two enabled BTUs that are at least implicitly linked together, the I/O channel controller 116 initiates autonomous data transfers to retrieve a portion of the data stream defined by the host side BTU from the memory 106 directly 126, transiently store the data in an internal FIFO pool, and transfer the data autonomously to a sequence of locations in the memory 122 defined by the DSP side BTU. The autonomous operation of the I/O channel controller in accessing the memory 106 is preferably as a bus master device that participates directly in the memory cycle arbitration supported by the hardware bus management controller of the host processor 12 and PCI bridge interface 18. As a consequence, essentially no execution cycles of the host processor 12 need be utilized in actually performing the data transfer 126.

Execution cycles of the host processor 12 are effectively required to form the data stream in the memory 106 and, in typically executing the device driver 112, to initially establish and manage the series of one or more host side and DSP side BTUs that define the control thread for the data stream transfer. However, the execution cycles required in the creation and management of the BTUs by the host processor 12 are relatively minor in comparison to the execution cycles required to initially process and then store the data stream in the memory 106 under the control of an application 92, 94. Furthermore, the operation of the I/O channel controller 116 permits the formation of the data stream in the memory 106 to be loosely synchronous with the actual transfer of data 126 under the control of the I/O channel controller 116. Consequently, the limited execution of the device driver 112 by the host processor 12 in creation and management of host side BTUs need not be tightly coupled to the real time demand for data transfers through the I/O channel controller 116.

The loose synchronism in the execution of the host processor 12 in support of the I/O channel controller 116 is further facilitated by the autonomous demand driven operation and FIFO pool buffering functions of the I/O channel controller core 116 itself. The I/O channel controller core 116 is autonomously capable of fetching successive BTUs from both the memory 106 and memory 122, though preferably only from the memory 106, as a data stream transfer proceeds. Thus, as the portion of the data stream controlled by a BTU is completed, the I/O channel controller core 116 can fetch the next BTU in the control thread from memory and substitute the newly fetched BTU for the completed BTU. Thus, an outbound data stream directed to the memory 122 is transferred autonomously as long as successive source and destination control BTUs in the control thread are defined to provide for the ongoing transfer of the data stream. The rate that DSP side BTUs are completed, reloaded and re-enabled effectively reflects the data throughput rates demanded by the digital signal processor 120 in respective performance of each commanded function.

A simpler mode of operation occurs when the data stream destination is the external hardware 124. The I/O channel controller 116 provides limited but adequate buffering for data transferred to the external hardware 124 via the data path 130. As the external hardware 124 demands data from the I/O channel controller 116, a current BTU is utilized to control the transport of the data stream from the memory 106 to the I/O channel controller core 116. As the external hardware 124 draws down on the available data buffered by the I/O channel controller core 116, the controller 116 autonomously operates to refill the buffer from a location in memory 106 defined by the current BTU. As the data referenced by the current BTU is consumed by the external hardware 124, a next sequential BTU in the control thread is autonomously loaded by the I/O channel controller 116 from the memory 106 in order to maintain the transfer of the data stream 126

Incoming data streams are handled in a generally similar manner by the I/O channel controller core 116. A data stream received by the DSP 120 from directly connected external hardware may be processed by the DSP 120 and stored in the memory 122. Receipt of each incoming data stream is anticipated by the host processor 12 and a corresponding control thread of one or more DSP side BTUs is formed in the memory 106 with the initial BTU being programmed into the I/O channel controller core 116, subject to being subsequently enabled by the DSP 120. A control thread of one or more host side BTUs is also established in the memory 106 again with the initial BTU being programmed into the I/O channel controller core 116. Although empty, this initial host side BTU is preferably set to an enabled state.

A command message, specifying the function to be performed by the DSP 120, is then posted to a message storage register within the I/O channel controller core 116. Preferably, the message is acknowledged by the DSP 120, the requested function is initialized, a portion of the externally provided data stream is received and processed by the DSP 120 and stored in a known address block within the memory 122. An enable signal 136 is then provided to the I/O channel controller core 116 to enable the initial DSP side BTU and allow for the autonomous transfer of the received data stream. When the DSP side BTU specified data stream transfer has completed, the next DSP side BTU is loaded into the I/O channel controller core 116 and left disabled. Meanwhile, a next portion of the externally provided data stream is received and processed into another known address block within the memory 122 that is referenced by the next DSP side BTU. Again, once this address block has been filled with processed data, the now current DSP side BTU is enabled in response to the enable signal 136. In general, the two address blocks in the memory 122 are successively alternatingly used in successive alternation for the processing of a single data stream.

When the address block specified by the current host side BTU in the memory 106 is filled by the processed incoming data stream, the BTU is complete and the I/O channel controller core 116 issues an interrupt 132 to the interrupt handler 110 that calls the device driver 112 to at least signal that the address block is available for host processing. Preferably, a next BTU specifying another address block in the memory 106 is also autonomously loaded in an enabled state by the I/O channel controller core 116 to continue the receipt of the processed incoming data stream.

Subject to the reasonable assumption that the transfer of data between the I/O channel controller core 116 and memory 106 is substantially faster than the rate that the DSP can receive, process and store data into the memory 122, minimal but adequate buffering within the I/O channel controller 116 can ensure that demand driven transfer of the data stream 128 occurs without data overrun.

The I/O channel controller core 116 also provides data buffering for any data stream received directly from the external hardware 124. In general, the external hardware 124 is enabled for operation in response to the host processor execution of the device driver 112. The I/O channel controller core 116 preferably provides a register interface to the device driver 112 that permits programmed I/O through to the programmable registers of the external hardware 124. Concurrent with the initialization of the external hardware 124, a BTU control thread is established in the memory 106 and an initial BTU is programmed into the I/O channel controller core 116 and enabled to control the receipt of data. A data stream 130 is buffered directly into the I/O channel controller core 116 at the externally demanded data transfer rate. In turn, the I/O channel controller 116 autonomously operates to transfer the received data stream to the memory 106 under control of the current BTU. Again reasonably assuming that the I/O channel controller core 116 can transfer data to the memory 106 at a rate greater, though preferably substantially greater, than that of the received data stream 130, data overrun is again effectively precluded.

III. I/O Channel Controller Architecture

Figure 5A:
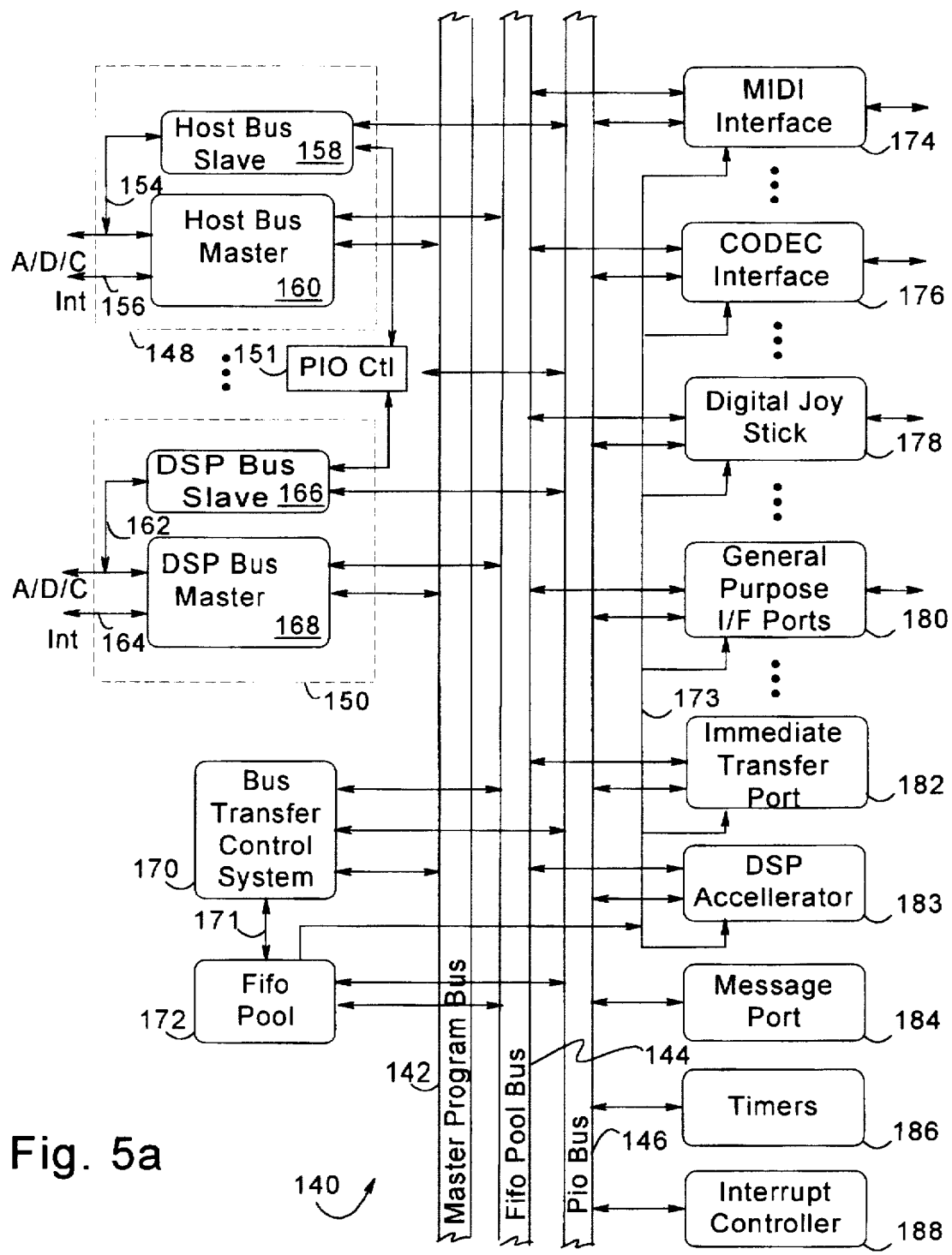
FIG. 5a is a detailed block diagram of a preferred embodiment of an I/O channel controller of the present invention.

The general architecture of an I/O channel controller 140, constructed in accordance with a preferred embodiment of the present invention, is shown in FIG. 5a. The I/O channel controller 140 preferably employs three major internal buses, including a bus master program bus 142, a FIFO pool bus 144, and a PIO bus 146. The bus master program bus 142 provides a communication channel between any number of bus interface modules 148, 150 and a bus transfer control system 170. The FIFO pool bus 144 is a dedicated bus for typically high-speed burst data transfers between the bus interface modules 148, 150, a FIFO pool 172 and any number of integrated peripherals and peripheral interfaces 174–188. The PIO bus 146 provides a general purpose programmed I/O communications path between the bus interface modules 148, 150, the bus transfer control system 170, and the integrated peripherals and peripheral interfaces 174–188. A PIO bus access controller 151 operates as a PIO bus access arbiter between each of the bus interface modules 148, 150.

Each of the bus interface modules 148, 150 serve to connect the I/O channel controller core 140 with a respective external communications bus. The host interface module 148 serves to couple the I/O channel controller 140 to the external PCI bus 20 while the DSP bus interface module 150 similarly provides for an interface to the peripheral bus 30 that connects to the external digital signal processor 32 and DSP RAM 34.

The host interface module 148 connects to the address, data, and control (A/D/C) lines 154 of the bus 20 and provides an external interface for an interrupt line 156 driven by an interrupt controller internal to the I/O channel controller core 140. Within the host interface module 148, the address, data and control lines 154 connect to a host bus slave unit 158 and a host bus master unit 160. The host bus slave unit 158 provides a conventional register based programmed I/O interface to the PIO bus 146 so as to make the PIO bus 146 accessible to the host processor 12. The register interface also allows program access to and through the PIO bus 146 to programmable configuration and data registers of the various units internally connected to the PIO bus 146. The host bus slave unit 158 also provides an externally accessible register interface that permits programmed control of the host interface module 148. The host bus master unit 160 itself preferably includes the control logic appropriate to support conventional bus-master access arbitration on the PCI bus 20.

The DSP bus interface module 150 similarly connects the address, data, and control lines of the DSP bus 30. The address, data and control lines 162 connect to both a DSP bus slave unit 166 and a DSP bus master unit 168. The external interface for an interrupt line 164 driven by an interrupt controller internal to the I/O channel controller core 140 is also supported by the DSP bus interface module 150. The DSP bus slave unit 166 provides a programmable register interface that allows for programmable control of the DSP bus master unit 168 as well as supporting general programmed I/O access between the bus 30 and the PIO bus 146. The DSP bus master unit 168 also includes control logic appropriate to permit conventional bus-master access arbitration on the DSP bus 30.

Coordinated access to the PIO bus 146 by the host and DSP interface modules 148, 150 is controlled through the PIO controller 151. Each of the bus slave units 158, 166 must arbitrate for exclusive access to the PIO bus and through to any of the interface registers accessible by way of the PIO bus 146. In addition, the host bus slave unit 158 can request a PIO bus bypass to be established by the PIO controller 151. A bypass data path is established from the host process 12, through the host bus slave unit 158, the PIO bus 146 and the DSP bus slave unit 166. The host processor 12 is thus presented with a data path that allows all peripherals accessible via the DSP bus 30 to be controlled directly by the host processor 12. This is useful in simplifying the control over the operation of some of the parallel bus peripherals 38, for example, to directly set or read the control mode of a CODEC 42.

The bus transfer control system 170 operates as a central control system managing the transfer of burst data transfers between the host and DSP bus master units 160, 168, the FIFO pool 172 and the integrated peripherals and peripherals interfaces 174–183 that are connected to the FIFO pool bus 144. The bus transfer control system 170 maintains a programmable table of BTUs. In the preferred embodiment of the present invention, the BTU table provides simultaneous storage for 48 BTUs with each BTU occupying 16 consecutive bytes of storage. Table I provides a description of the preferred BTU structure.

TABLE I

| Field | Bytes | Bits |
|---|---|---|
| Address | 4 | [31:0] |
| Transfer Length | 2 | [15:0] |
| Link Descriptor | 2 | [15:0] |
| Control Word | 2 | [15:0] |
| Status Word | 2 | [15:0] |
| Reserved | 4 | [31:0] |

The address field of a BTU structure defines the memory address used by the host and DSP bus master units 160, 168 for the transfer of data between the system main memory 14 and the I/O channel controller 26 and between the I/O channel controller 46 and DSP RAM 34. As a data transfer proceeds, the address field value of the BTU is updated to maintain the address value as a proper memory pointer. Conversely, the transfer length value is decremented as the transfer proceeds to maintain an accurate reflection of the remaining transfer length described by the BTU. In the preferred embodiment of the present invention, the host address space is treated as a flat 32 bit address field. The address field for purposes of DSP bus master transfers may be differently defined. As specified in Table II, a symmetric partition of the DSP RAM 34 can be readily enforced by definition of a high order bit or bits of the address field to selectively map the DSP RAM of multiple digital signal processors 32, 36 or other peripherals 38 that might provide or utilize a discrete storage area within the DSP RAM 34 into a common address space with respect to the I/O channel controller core 140.

TABLE II

| Address (DSP only) | Description | Bit |
|---|---|---|
| DSP | DSP#1 or DSP#0 | 31 |
| DM | Data (1) or Program (0) Memory | 30 |
| Reserved | Reserved for future use | [29:15] |
| Address | Byte Address | [15:0] |

The link descriptor field permits storage of an array pointer to a next sequential BTU in the current control thread. Preferably, the successive BTUs of a control thread not resident in the BTU storage space provided by the I/O channel controller 26 are stored in a table within system main memory 14, though BTUs can also be stored in DSP RAM 34. Where a BTU is stored in system main memory 14, a two-byte host base link address value is separately stored in a configuration register of the I/O channel controller core 140. This host base link address, effectively the base address of the BTU table in system main memory 14, is concatenated with the current BTU link descriptor value to provide a memory reference to a next linked BTU stored in system main memory 14. Conversely, the BTU link descriptor alone is sufficient to provide the entire address specification needed to access a linked BTU stored in the DSP RAM 34. The link descriptor field is utilized in the autonomous loading of a next linked BTU when the transfer length of a current BTU in the I/O channel controller core 26 is decremented to zero. Whether the link descriptor field is autonomously utilized to load a next BTU is determined by control bit values stored within a configuration control word register. Table III defines the preferred definition of the control word register

TABLE III

| Control Word | Description | Bit |
|---|---|---|
| Bus Master | Bus Master from DSP/Host memory | 15 |
| Interrupt | Interrupt upon BTU completion<br>00 No Interrupt<br>01 Host Interrupt<br>10 DSPA Interrupt<br>11 DSPB Interrupt | [14:13] |
| Link Defined | Link information is valid/not valid (i.e. wait) | 12 |
| Link Master | Link to BTU link table<br>00 No Link<br>01 Link from Host<br>10 Link from DSPA<br>11 Link from DSPB | [11:10] |
| Data Conversion | Select data transformation during transfer | [9:8] |
| Burst Length | Burst 32/not 16 bytes at a time | 7 |
| Direction | Transfer from/not to the FIFO | 6 |
| Reserved | Reserved for internal use | 5 |
| FIFO Number | Select FIFO from FIFO pool | [4:0] |

Within the control word field, the bus master bit defines whether the BTU corresponds to a host-side or DSP-side control thread. The interrupt sub-field defines whether and to whom an interrupt will be ultimately issued upon decrementing the BTU transfer length to zero. Encoding of an interrupt source vector and the actual generation of the external interrupt signal is controlled by an interrupt controller 188 internal to the I/O channel controller core 140. The link define bit specifies whether the link descriptor field maintains a valid value or not. The link master sub-field stores the base address location of the BTU link table in system main memory 14. The data conversion sub-field encodes a data transformation to be applied to the data as transferred, such as byte order reversal or byte/word conversion.

The burst length bit selects between 16 and 32 byte burst transfer lengths while the direction bit specifies the direction of the burst transfer. The FIFO number sub-field serves to identify the numeric identifier of a particular FIFO within the FIFO pool 172 that is to be used as either the source or destination of data transferred under the control of the current BTU.

Finally, the status word field of a BTU, as detailed in Table IV, defines individual bits that reflect whether a specific BTU is busy, such as during a BTU update operation that is autonomously performed by the I/O channel controller core 26, and whether the BTU is both valid and currently available, or enabled, for participation in the arbitration for a bus master access.

TABLE IV

| Sub-Field | Description | Bit |
|---|---|---|
| Busy Bit | BTU is busy transferring/linking (Read Only) | 1 |
| BTU Enable | Allows BTU to arbitrate for Bus Master | 0 |

A multi-stage circular priority arbiter (CPA) is preferably implemented by the bus transfer control system 170 to continuously evaluate the currently enabled BTUs. The arbiter is coupled to the BTU table in a manner that allows direct identification of those BTUs that have their BTU Enable bit set. Within the identified set of enabled BTUs, the CPA operates to progressively select and stage BTUs for each of the host and DSP bus master units 160, 168.

The core algorithm implemented by the CPA operates in response to the set of access requests, further constrained to the identified set of enabled BTUs, that exist in an arbitration cycle. All possible requestors are ordered left to right in basic relative priority. The CPA of the present invention provides additional qualifications on the priorities of the enabled requestors. Specifically, the winning requestor of the immediately prior arbitration cycle effectively has no priority in the current cycle. The first enabled requestor, if any, to the right of the prior winning requestor is pushed to the highest priority in the current arbitration cycle with priority decreasing further to the right. If no enabled requestor exists in the current cycle to the right of the prior winning requestor, then the basic left to right relative priority of the enabled requestors is used to select a current winning requestor.

The decision matrix for the CPA is preferably implemented as a modified inverted binary tree. Additional control logic is provided to maintain state information that identifies the winning requestor of the immediately prior arbitration cycle. Also provided is state information that identifies the sub-trees that include the prior winning requestor and whether, at the lowest node in a sub-tree, the prior wining requestor is left or right relative to this lowest binary node. Consequently, an efficient mechanism is provided to ensure substantially fair arbitration among all potential requestors.

The bus transfer control system 170 is shown in greater detail in FIG. 5b. The bus transfer control system 170 includes the circular priority arbiter 190. Individual access requests for access to the BTU table 192 are received via control lines 194 from the devices connected directly to the bus master program bus 142 and the PIO bus 146. Data and BTU address portions of both the bus master program bus 142 and PIO bus 146 connect to the BTU table 192 to allow the reading and writing of BTUs. The bus master program bus 142 also connects to a BTU scanner 196 that is treated by the arbiter 190 as continually requesting access to the BTU table 192. The BTU scanner 196 operates to continually scan enabled BTUs stored in the BTU table 192 for the purpose of staging BTU identifiers and related data in host and DSP staging registers within a internal register set 198. The preferred BTU register array definition is provided in Table V.

TABLE V

| Sub-Field | Description | Bytes |
|---|---|---|
| BTU Control | Reset, single step scan, enable, and remove valid for programming restriction | 2 |
| Host Base Link Value | host BTU table offset in main memory | 2 |
| Host Best BTU | best BTU register | 2 |
| Host Current BTU | current BTU register | 2 |
| Host Scan BTU | scan BTU register | 2 |
| DSP Best BTU | best BTU register | 2 |
| DSP Current BTU | current BTU register | 2 |
| DSP Scan BTU | scan BTU register | 2 |

Each access to the BTU table 192 is uniquely arbitrated through the operation of the arbiter 190. The bus master units 160, 168 each separately request access to the BTU table 192 whenever they are otherwise idle to obtain BTU stored data that will be programmed into the bus master unit 160, 168 to define a bus master burst data transfer. The bus master units 160, 168 also request access to the BTU table 192 following a burst data transfer to update the currently active BTU.

The bus slave units 158, 166 are permitted access to the BTU table 192 via the PIO bus 146. Such accesses are supported to typically allow the host processor 12 and DSPs 32, 36 to program initial BTUs into the BTU table 192 and to subsequently enable the BTUs. The PIO bus 142 can also be used to permit the host processor 12 to examine the state of the BTUs as needed to monitor data transfer progress at a low level and to analyze error conditions should they arise.

Essentially all other BTU table access cycles are made available to the BTU scanner 196. By considering only those BTUs that are enabled and thereby implicitly valid, the scan speed of the scanner 196 is maximized while reducing or minimizing the overall complexity of the scanner 196. As each valid and enabled BTU is scanned, the BTU scanner 196 also obtains supporting FIFO flag status information via the FIFO flag bus 171 for the FIFO referenced by the BTU being scanned. Consequently, the BTU scanner 196 makes effective and efficient of all accesses to the FIFO flag store.

Finally, the bus transfer control system 170 potentially generates interrupts depending on programmed controls upon each update operation of a BTU within the BTU table 192. Whether a particular update operation will result in the issuance of an interrupt is determined by whether the update operation signals a bus master transfer error, a BTU transfer complete, and the programmable interrupt specification bits within the control word of the BTU being updated. If an interrupt is to be generated, it is issued via control lines 200 to the interrupt controller internal to the I/O channel controller core 26.

Each BTU access arbitration cycle can be viewed as beginning when a BTU controlled bus master burst transfer completes by either the host or DSP bus master unit 160, 168. The corresponding BTU is updated and a next BTU, selected as a product of prior arbitration cycle, is used as the source of data for programming a bus master unit 160, 168 for the next bus master burst transfer. The data transfers specified by individual BTUs are not processed until complete, but rather segmented or partitioned on burst length boundaries and interleaved with the data transfers specified by other BTUs.

The next BTU is immediately available for use in programming a bus master cycle due to the pre-staging of arbitrated BTUs. Thus, when a next BTU is staged down for programming into either the host or DSP bus master units 160, 168, the circular priority arbiter operates to select and stage a new next BTU before the current bus master burst transfer completes. Consequently, the maximum potential data bandwidth supportable by the I/O controller is limited only by the potential bus master transfer speeds supportable between the I/O channel controller 26 and the system main memory 14 and RAM 34.

Table VI describes the bus master programming address and control interface employed by both the host and DSP bus master units 160, 168.

TABLE VI

| Bus Master Address Bus | Descriptions | Bit |
|---|---|---|
| Address | Start Address for Transfer | [31:0] |

| Bus Master Xfer Control | Descriptions | Bit |
|---|---|---|
| Link | Link rather than transfer | 18 |
| Transfer done | Send TD to FIFO after transfer | 17 |
| BTU done | Send BTUD to FIFO after transfer | 16 |
| FIFO Byte Enables | FIFO byte enables (encoded) | [15:14] |
| Burst | Number of bytes to transfer | [13:8] |
| Data Conversion | Bytes swapping during transfer (from BTU) | [7:6] |
| Direction | Transfer from/not the FIFO | [5] |
| FIFO Number | FIFO from FIFO pool | [4:0] |

To program a bus master 160, 168 for a data burst transfer, an address portion of the bus master program bus 142 is provided with the memory address for the data transfer as maintained in the address field of the BTU. A transfer control bus portion of the bus master program bus transfers the control signals described in Table V to the bus master units 160, 168. The link control bit will specify that the current bus master burst transfer is for data and not a changed or linked-to BTU. The transfer done and BTU done control signals allow stream status information to be effectively encoded into FIFO data streams. The FIFO byte enables sub-field provides an encoded value of the ordered byte position of data within a four byte word that is being transferred in the current bus master data burst. The burst sub-field specifies the number of bytes to transfer as part of the program burst data transfer. The data conversion sub-field reflects the desired data conversion to be applied to the data transfer. The direction control bit identifies the direction of the burst data transfer. Finally, the FIFO number specifies the FIFO within the FIFO pool that is to participate in the burst transfer.

Once programmed, the host and DSP bus master units 160; 168 autonomously operate to arbitrate for and perform sufficient bus access cycles to carry out the programmed burst data transfer. Where the burst data transfer is into the I/O channel controller 26, the burst data is temporarily stored in a FIFO within the bus master units 160, 168. A separate, request acknowledge arbitration is then performed by the bus master units 160, 168 to gain access to and through the FIFO pool bus 144 to the FIFO pool 172. Data from the internal FIFOs is then transferred to the FIFO pool 172 and specifically to the FIFO specified by the FIFO identifier of the current BTU.

For data that is outbound from the I/O channel controller 26, the bus master units 160, 168 initially arbitrate for access to the FIFO pool 172 and pre-load their internal FIFOs with the burst length number of bytes from the FIFO specified by the BTU provided FIFO identifier. An autonomous bus master operation then proceeds to perform a burst data transfer from the internal FIFOs out from the host or DSP bus master units 160, 168.

A slightly different programming of the bus master units 160, 168 is utilized to retrieve a linked to next BTU in autonomously continuing, or at least preparing to continue either a host side or DSP side control thread. On completion a full data transfer specified by a BTU with a valid and enabled link descriptor, the BTU is cycled through the circular priority arbiter until the BTU is again selected to control a bus master burst data transfer. The zero transfer length of the BTU causes the link descriptor to be passed via the low order portion of the bus master program bus to the host or DSP bus master unit 160, 168, as appropriate. Where the BTU is stored in system main memory 14, the high order address portion of the bus master program bus is used to simultaneously provide the host based link descriptor to the host bus master unit 160. The BTUs in the RAM 34 are stored within the address scope of the link descriptor alone. In all events, the link control bit is set to signal that a linked-to BTU transfer burst is being programmed. Preferably, the internal FIFOs of the host and DSP bus masters 160, 168 have a depth at least equal to the size of a BTU. Thus, a single bus master burst transfer can be utilized to retrieve the desired BTU from either the system main memory 14 or DSP RAM 34. Once the desired BTU has been stored in a bus master internal FIFO, the host or DSP bus master unit 160, 168 requests access to the bus master program bus 142 to transfer the BTU to the bus transfer control system 170. Access is requested by the assertion of a request control signal on the bus master program bus 142. An acknowledge signal generated by the bus transfer control system 170 grants unique access to a word-wide update/link data bus 173 provided generally in connection with the FIFO pool bus 144.

TABLE VII

| FIFO Update Bus | Descriptions | Bits |
|---|---|---|
| Update Flag | indicates an Update cycle | 1 |
| FIFO Number | number of the FIFO being updated | 5 |
| Read Size | number of data bytes in FIFO | 6 |
| Write Size | number of open bytes in FIFO | 6 |
| Read Byte Enables | read byte selection within FIFO | 4 |
| Write Byte Enables | write byte selection within FIFO | 4 |
| BTU Done | BTU Done flag to Flag Store | 1 |
| Transfer Done | signals transfer done | 1 |
| Space Available | is space available in the FIFO | 1 |
| Data Available | is data available in the FIFO | 1 |

A two-bit bus master link address bus is driven by the bus transfer control system 170 to coordinate the preferably three update/link data bus access cycles necessary to transfer the complete BTU to the BTU table within the bus transfer control system 170; the fourth byte is currently reserved and not transferred. The effectively linked-from BTU is overwritten with the linked-to BTU. The location in the BTU table of the current BTU is maintained by the bus transfer control system to permit a status update operation on the BTU following each bus master burst data transfer. Where the current BTU is also a linked-from BTU, the update operation directly provides for the in-place overwriting of the linked-from BTU with the linked-to BTU. The linked-to BTU is then cycled into the ongoing arbitration operation of the circular priority arbiter.

IV. Distributed Status and Control System

The bus transfer control system 170 generally serves to manage the transfer of data through the bus master interfaces 148, 150 with respect to the FIFO pool 172. However, the FIFO pool 172 itself implements access control logic that serves to centrally control the grant of data access cycles to the FIFO pool bus 144. As detailed in Table VII, the FIFO pool bus 144 preferably includes a 32-bit wide data bus, a five-bit wide address bus, and unique access request and grant control lines that allow each of the bus master interfaces 148, 150 and the integrated peripherals and peripheral interfaces 174–182 to individually request access to the FIFO pool bus 144 and to receive individual access acknowledged signals.

TABLE VIII

| FIFO Pool Bus | Descriptions | Bits |
| --- | --- | --- |
| Request | request lines for FIFO pool access | 10 |
| Request Done | last request to FIFO pool for this transfer | 10 |
| Acknowledge | acknowledge lines for FIFO pool access | 10 |
| FIFO Number | number of FIFO being accessed | 5 |
| Byte Enables | byte selection within FIFO | 4 |
| Data In | data from device to FIFO pool | 32 |
| Data Out | data from FIFO pool to device | 32 |
| Direction | data transfer direction | 1 |
| BTU Done | BTU Done flag to Flag Store | 1 |
| Data Available | is data available in the FIFO | 1 |

Associated with and generally part of the FIFO pool bus is the FIFO update bus (Table VI). The FIFO update bus preferably includes a five-bit FIFO status bus that is used to broadcast the FIFO identifier of a FIFO within the FIFO pool 172 to at least all of the integrated peripherals and peripheral interfaces 174–183 that are coupled to the FIFO pool bus 144. A FIFO identifier is broadcast over the update bus whenever data is added to or drawn from the corresponding FIFO in the FIFO pool 172. By effectively broadcasting notice of changes in the state of the FIFOs within the FIFO pool 172, the FIFO pool implicitly simplifies the necessary operation of the circular priority arbiter implemented within the FIFO pool 172 as well as the corresponding control logic necessary within each of the integrated peripherals and peripheral interfaces 174–183.

Distributed control logic is provided with each of the integrated peripherals and peripherals interfaces 174–183 that connect to the FIFO pool bus 144. Each of these integrated peripherals and peripherals interfaces 174–183 are preferably programmable with one or more FIFO identifiers, corresponding to the number of FIFOs in the FIFO pool 172 that are needed to support their respective functions. Each FIFO supports a unidirectional data stream, so pairs of FIFOs are required for full-duplex communication. The distributed logic in each of the integrated peripherals and peripheral interfaces 174–182 monitors the FIFO identifiers broadcast over the FIFO status bus for matches with their pre-programmed identifiers. When an identifier match is found, the integrated peripheral or peripheral interface 174–183 may then issue a control signal request for a data transfer cycle on the FIFO pool bus 144. A unique acknowledge signal is subsequently issued by the FIFO pool 172 to grant access to the FIFO pool bus. Thus, the circular priority arbiter of the FIFO pool 172 need only consider access requests from integrated peripherals and peripheral interfaces 174–183 for which a real data transfer can be performed. Furthermore, as there may be any number and combination of types of integrated peripherals and peripheral interfaces 174–183, the circular priority arbiter of the FIFO pool 172 is effectively isolated from needing to consider any specialized aspects of a data transfer cycle requested by any particular one of the integrated peripherals and peripheral interfaces 174–183. Specifics of operation that might affect the appropriateness of requesting a memory access cycle on the FIFO pool bus 144 is managed internally by each of the integrated peripherals and peripheral interfaces 174–182 as appropriate to their specific function. Consequently, substantial portion of the access determination and arbitration control logic is effectively distributed throughout the I/O controller 140. The control logic associated with the circular priority arbiter of the FIFO pool 172 need not be fundamentally or even significantly modified should the type, number or function of any of the integrated peripherals or peripheral interfaces 174–183 change between different specific implementations of the I/O channel controller core 140.

V. Integrated Peripherals and Interfaces

The integrated peripherals and peripheral interfaces 174–188 each preferably present a register based interface via the PIO bus 146 to the remainder of the I/O channel controller core 140. Each of these register interfaces are thereby accessible by the host processor 12 and digital signal processors 32, 36 by way of the host and DSP bus slave units 158, 166. The register interface to the PIO bus provided by each instance of the integrated peripherals and peripheral interfaces 174–188 may vary from simple to significantly complex. In general, the register interface is required to permit programming of the desired operation of the peripheral 174–188, to permit a reset of the peripheral 174–188, to specify the conditions upon which interrupts may be generated and the external processor to which the interrupt will be issued, and, where the peripheral 174–183 also connects to the FIFO pool bus 144, storage for a FIFO identifier for each concurrent data stream supportable by the particular peripheral 174–188.

In addition, each of the integrated peripherals and peripheral interfaces 174–183 include a data staging FIFO providing for the transient storage of data being transferred to or from the FIFO pool bus 144. Preferably, the depth of this internal FIFO is sufficient to protect against data under-runs and over-runs in view of the throughput data rate anticipated to be supported by the integrated peripheral or peripheral interface 174–183 and the worst case bus data transfer latency between the FIFO pool 172 and particular integrated peripheral or peripheral interface 174–183. Where the anticipated data transfer rate through an integrated peripheral or peripheral interface is sufficiently low, the internal FIFO may be implemented simply as a single buffer register. Peripheral internal FIFOs are, however, typically two to four bytes in depth.

A preferred MIDI interface peripheral interface 174 implements a relatively simple register interface to the PIO bus 146. The preferred control registers implemented by the MIDI interface peripheral 174 include a transmit control register and a receive control register. The register interface is detailed in Table IX.

TABLE IX

| MIDI XMit Control Register | Descriptions | Bit |
| --- | --- | --- |
| Reserved | Not used or test values | [31:7] |
| Transmit Enable | Enable MIDI transmit | 6 |
| Reset | Reset the MIDI transmit port | 5 |
| FIFO Number | FIFO from FIFO pool | [4:0] |
| MIDI Receive Control Register | Descriptions | Bit |
| Reserved | Not used or test values | [31:10] |
| Interrupt Select | 00 => no interrupt generated | [9:8] |
| | 01 => interrupt host CPU | |
| | 10 => interrupt DSP 1 | |
| | 11 => interrupt DSP 2 | |
| Receive Enable | Enable MIDI receiver | 7 |
| Reset | Reset the MIDI transmit port | 6 |
| FIFO Number | FIFO from FIFO pool | [5:0] |

The transmit control register includes a five bit FIFO ID field, a reset bit and a transmit enable bit. The receive control register preferably includes a five bit FIFO ID field, a reset bit, a receive enable bit, and a two bit interrupt field that encodes whether an interrupt is to be generated in response to an error condition coincident with the receipt of a data byte or word through the external interface or MIDI interface peripheral 174 and, if so, the intended destination of the interrupt. Interrupts are preferably generated by this peripheral 174 only on error conditions. Logically connected immediate transfer ports are preferably used to generate data transmitted/received interrupts that serve to control the flow of data through the MIDI interface peripheral 174.

The register interface to the CODEC peripheral interface 176 may be significantly more complex than that of the MIDI interface 174. Where a conventional external CODEC is to be attached to the CODEC interface 176, the register interface needs to provide access to the control and data registers of the external CODEC itself. Alternately, the CODEC peripheral interface 176 may itself implement part or all of the functionality of a conventional CODEC, thereby limiting the required external components connected to the CODEC peripheral interface 176 to comparatively minimal analog components. In this latter instance, the CODEC interface 176 is then a fully integrated peripheral that directly presents CODEC control registers to the PIO bus 146. In either instance, the CODEC interface 176 includes the logic necessary to permit the CODEC interface 176 to arbitrate for access on the FIFO pool bus 144 and to monitor for changes in the status of a FIFO pool 172 FIFO corresponding to a FIFO identifier programmed into a register of the CODEC interface 176.

Figure 5C:
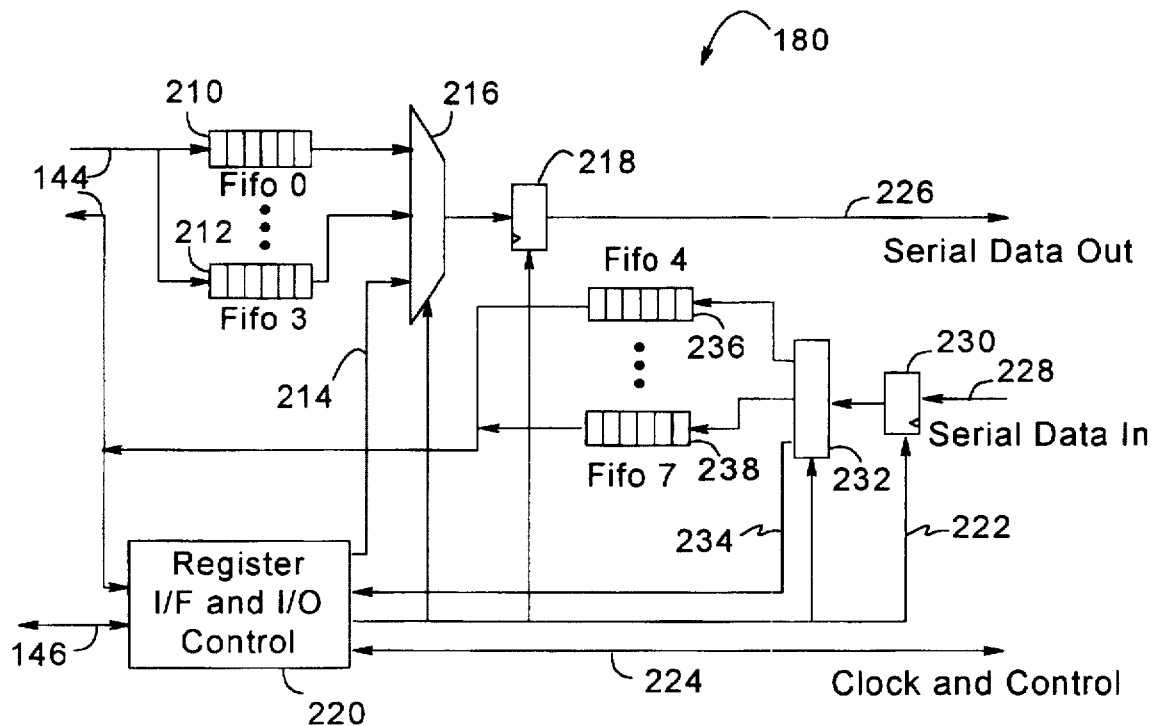
FIG. 5c is a detailed block diagram of a preferred CODEC embodiment of an integrated peripheral interface of the present invention.

FIG. 5c shows the preferred implementation of the CODEC interface 176 as used to support an external CODEC, such as an Analog Devices 1843 CODEC. The essential CODEC interface data path and control logic 180 provides support for multiple, essentially bidirectional data streams to be passed over the data portion of the FIFO pool bus 144 between respective pairs of FIFOs potentially allocated within the FIFO pool 172 and FIFO pairs internal to the CODEC interface 176. Preferably up to four outbound data streams are buffered through four internal FIFOs 210–212. A data multiplexer 216 provides for the selection of eight or 16-bit data variously from the FIFOs 210–214 in correspondence with the control mode established in the external CODEC. The byte or word data stream is passed through a clocked latch and serializer 218 under the control of a register interface and I/O control unit 220. Clock and control signals are provided by the register interface and I/O control unit 220 via the clock and control lines 222. The register interface and I/O control unit 220 coordinates the transfer of data with the external CODEC through the exchange of clocking and control signals on lines 224. Thus, subject to the operation of the register interface and I/O control unit 220, serialized data is provided on a serial data out line 226 to the external CODEC.

CODEC mode commands and command related data are also provided to the external CODEC on the serial data out line 226. Mode commands and data is preferably provided via the PIO bus 146 to the register interface and I/O control unit 220. The mode commands and data are then routed, via lines 214, through the multiplexer 216 and latch 218 while a command mode transaction is signaled via lines 224.

Serial data from the external CODEC is received on line 226 by a clocked de-serializer and latch 230. Depending on the current command mode of the external CODEC, status information and related data is provided through a de-multiplexer 232 and over lines 234 to the register interface and I/O control unit 220. Other byte or word wide data is provided from the de-multiplexer 232 selectively to any of four internal FIFOs 236–238 under the control of the register interface and I/O control unit 220.

The register interface and I/O control unit 220 also provides the request and acknowledge control logic to support data transfers over the FIFO pool bus 144. The register interface and I/O control unit 220 preferably provides register storage for up to eight FIFO identifiers. Each FIFO identifier permits a particular internal FIFO to be uniquely associated with any one of the FIFOs in the FIFO pool 172. The FIFO update portion of the PIO bus 144 is continually monitored by the register interface and I/O control unit 220 to identify when the status of an identified FIFO changes. The register interface and I/O control unit 220 typically issues a FIFO pool access request on behalf of the internal FIFO whose FIFO identifier matches the FIFO identifier broadcast over the update bus.

The FIFO identifier registers and other CODEC interface control registers are accessible typically by the host processor 12 via the PIO bus 146. The preferred CODEC register interface presented to the PIO bus 146 is provided in Table X.

TABLE X

| CODEC Registers | Descriptions | Bit |
| --- | --- | --- |
| Master Control | DAC/ADC control | [15] |
| Audio Command | command to Audio CODEC | [14:9] |
| Audio Data | mode set data to Audio CODEC | [8:3] |
| Telephony Command | command to Telephony CODEC | 2 |
| Telephony Status | mode set data to Telephony CODEC | 1 |
| Status Command | read-only CODEC status bits | 8 |
| Status Data | read-only mode set data | |
| FIFO Number 0 | FIFO enable bit and pool number | 8 |
| ... | ... | 8 |
| FIFO Number 7 | FIFO enable bit and pool number | 8 |
| Clock | clock counter control | 16 |
| Host Mask | host interrupt mask value | 12 |
| DSP Mask | DSP interrupt mask value | 12 |
| Interrupt Control | transfer done, under/over run bits | 12 |
| Master Control | Descriptions | Bit |
| CODEC Reset | resets all CODEC related logic | [15] |
| DAC Mode | set DAC0,1 operating modes | [14:9] |
| ADC Mode | set ADC0,1 operating modes | [8:3] |
| Audio Enable | audio CODEC reset | 2 |
| Telephony Enable | telephone CODEC reset | 1 |
| CODEC Identifier | type of external CODEC | 0 |
| Interrupt Control | Descriptions | Bit |
| Transfer Done FIFO 0 | transfer done interrupt bit | 1 |
| ... | | |
| Transfer Done FIFO 3 | transfer done interrupt bit | 1 |
| Under Run FIFO 0 | under run interrupt bit (DAC1) | 1 |
| ... | | |
| Under Run FIFO 3 | under run interrupt bit (DAC4) | 1 |
| Over Run FIFO 4 | over run interrupt bit (ADC5) | 1 |
| ... | | |
| Over Run FIFO 7 | over run interrupt bit (ADC8) | 1 |

A joystick peripheral and potentially associated control console may be supported through the digital joy stick interface 178. The peripheral joy stick typically provides resistances that are proportional to the physical position of the joy stick. The digital joy stick interface 178 preferably implements a timer and capacitor that, combined with the resistances presented by the joystick peripheral, permit digital values representing the position of the joystick to be repeatedly developed autonomously by the digital joystick interface. The host processor 12 is thereby relieved of the need to set and function as a timer to determine the position of the joy stick. Preferably, the digital joystick interface 174 can be programmed to signal an interrupt that is passed to the host processor 12 or a DSP 32, 36 whenever the determined digital values change. Even where an interrupt is not generated, the digital values are continually made accessible via the PIO bus 146 through the register interface presented by the digital joy stick interface 178.

Depending on the configuration and data requirements of any associated control console, as may be developed in support of various gaming and control applications, a data stream may be passed through the FIFO pool 172 and digital joystick interface 178. Where the data stream transfer rate is generally low and latency is a issue, a logically connected immediate transfer port is preferably used to generate interrupts to the host processor 12 or either of the DSPs 32, 36 as data is transferred to or from the digital joystick interface 178. Where latency is not a significant issue or where the required data rate is relatively high, full bus master data transfers through the FIFO pool 172 can be used.

Another type of integrated peripheral or peripheral interface is represented by the general purpose interface ports 180. In a preferred embodiment, the interface ports 180 may implement a high speed, very wide parallel port suitable for interfacing to video controller or directly to a video frame buffer. Successive double word wide data transfers from the FIFO pool bus 144 may be buffered into a 64 bit, 128 bit or larger words that are transferred in parallel to the video controller or frame buffer. In this instance, one or more video words may be register buffered within the interface port 180 so as to permit an optimal matching of the timing of the word transfer to the controller or frame buffer.

The interface ports 180 may also be utilized to read a video controller or frame buffer at high speed. One, though preferably two or more frame words may be read in successive parallel read operations from the video controller or frame buffer into a wide buffer register, also configurable as an internal FIFO relative to the FIFO pool bus 144. Double word wide sections of the frame words can then be transferred to and through the FIFO pool 172.

The immediate transfer port integrated peripheral 182 is provided to establish high-speed, low latency connections through the FIFO pool 172 for typically low-bandwidth, latency sensitive data streams. The immediate transfer port integrated peripheral 182 provides preferably six independent transfer ports. Each transfer port is represented by a control register and a data register accessible via the PIO bus 146. The control register definition is provided in Table XI.

TABLE XI

| Immed. Transfer Port Ctl. | Descriptions | Bit |
| --- | --- | --- |
| Space/Data Available | set if space/data is available | 15 |
| Enable | transfer port enabled flag | 14 |
| Reset | reset transfer port | 13 |
| Data Width | 8 or 16 data transfer | 9 |
| Direction | transfer relative to FIFO | 8 |
| Interrupt Select | 00 => no interrupt generated<br>01 => interrupt host CPU<br>10 => interrupt DSP 1<br>11 => interrupt DSP 2 | [7:6] |
| FIFO Number | number of the pool FIFO | [4:0] |

| Immed. Transfer Port Data | Descriptions | Bit |
| --- | --- | --- |
| High Byte | upper byte of word data | [15:8] |
| Low Byte | lower or only byte of data | [7:0] |

The control register for an immediate transfer port permits the port to be programmed with a FIFO identifier, an interrupt target, a data transfer direction, the data byte or word width, a reset bit, an enable bit, and a space or data available bit.

The typical operation of an immediate transfer port is to monitor the update bus portion of the PIO bus 146 for any status change of an identified FIFO and to immediately issue an interrupt to the host processor 12 or DSP 32, 36 based on the programmed interrupt selection bits. A data stream transfer path is constructed between two processors utilizing 2 immediate transfer ports and a single FIFO in the FIFO pool 172. One of the immediate transfer ports is preferably programmed to issue a host interrupt whenever space is available in the identified FIFO. The second immediate transfer port is programmed to emit a DSP interrupt whenever data is available in the same identified FIFO. To initiate the data stream transfer and subsequently in response to host interrupts, the host processor 12 provides for the transfer of data through the host bus slave unit 158 and the PIO bus 146 to the I/O data register of the immediate transfer port associated with the host processor 12. The immediate transfer port places the received data in the identified FIFO of the FIFO pool 172.

In response to the FIFO identification broadcast by the FIFO pool 172 on the FIFO status bus, the second immediate transfer port issues a DSP interrupt. In response, a DSP 32, 36 accesses the I/O data register of the immediate transfer port. Data is read from the FIFO in the FIFO pool 172 and transferred to the DSP 32, 36 to be processed and, typically, written to the RAM 34.

Immediate transfer ports can be used in various combinations with the bus master interfaces 148, 150 and other integrated peripherals and peripheral interfaces 174–183 that access the FIFO pool 172. For example, the outbound data stream through the MIDI interface peripheral 174 may be transferred to a FIFO in the FIFO pool 172 by the host processor 12. When the change in the FIFO status in broadcast over the update bus, the MIDI interface peripheral 174 places a request for access to the FIFO pool 172 with the FIFO pool arbiter. As soon as access is granted, data from the FIFO pool 172 is transferred to the internal FIFO of the MIDI interface peripheral 174 and promptly output.

When data is removed from the identified FIFO in the FIFO pool 172, another immediate transfer port that has been programmed to respond to updates to the same identified FIFO preferably does not generate a host interrupt. In this instances the host processor 12 determines the timing for writes of MIDI data to the identified FIFO. When the host processor 12 determines to write MIDI data, the new data is written into the identified FIFO by staging the data through the data register of the host associated immediate transfer port. Where data is to be output at the maximum MIDI data rate, the host processor 12 can write more than a single byte or word of data into the FIFO of the FIFO pool. Thereafter, the host processor 12 can resume the output of MIDI data based on the time schedule determined by the host processor. Consequently, a low and substantially fixed latency cycle of transferring data from main memory 14 to the MIDI interface peripheral 174 can be sustained.

Inbound data through the MIDI interface peripheral 174 needs to be stored in system main memory 14 or RAM 34 with time stamp data. This time stamp data needs to be applied to the inbound data with a minimum and regular latency from the actual time of receipt by the MIDI interface peripheral 174. Consequently, an immediate transfer port is preferably associated with the MIDI input data FIFO in the FIFO pool 172 and programmed to issue an interrupt to either the host 12 or DSP 32 as data becomes available within the identified FIFO.

A DSP accelerator integrated peripheral 183 can also be provided as part of the I/O channel controller 140. In general form, the DSP accelerator 183 preferably implements a register interface available via the PIO bus 146 that supports connection with one or more input FIFOs from the FIFO pool 172 and one or more output FIFOs to return data to the FIFO pool 172 via the FIFO pool bus 144. Internally, the DSP accelerator 183 may implement dedicated hardware, a microcontroller, or both configured to perform, subject to programmable control register configuration, any of a number of computationally intensive data processing operations such as digital signal filtering, mixing and modulation. The number of FIFOs of the FIFO pool 172 connectable to the DSP accelerator 183 is therefore dependant on the particular functions potentially implementable by the DSP accelerator 183.

The message port integrated peripheral 184 provides a simple data path for transferring small quantities of data between the host and DSP processors connected to the I/O channel controller 140. In the preferred embodiment of the present invention, three message ports, each dedicated to source use by a particular host processor 12 or DSP 32, 36, are provided within the message port integrated peripheral 184. Each of the source dedicated message ports are represented as two 16 bit registers accessible from the PIO bus 146. Table XII describes the message port set and the control and data registers of each message port.

Table XII

| Message Port | Description | |
|---|---|---|
| Port 0 | host message send port | |
| Port 1 | DSP 1 message send port | |
| Port 2 | DSP 2 message send port | |
| Message Port Control Register for Port # | Descriptions | Bit |
| Reset | reset transfer port | 15 |
| Interrupt Select | 00 => no interrupt generated | [14:13] |
| | 01 => interrupt host CPU | |
| | 10 => interrupt DSP 1 | |
| | 11 => interrupt DSP 2 | |
| Access Pointer | word offset pointer in message | [7:0] |
| Message Port Data Register for Port # | Descriptions | Bit |
| Data | read/write data register | [15:0] |

The access pointer field operates as an auto increment pointer into a eight word (8×16-bit) deep message FIFO maintained internal to the message port. To send a message, the source processor clears the access pointer field, writes up to eight data words to the data register of the message port and then programs an interrupt to specify the destination processor for the message. The interrupt is effectively issued on setting the interrupt select field to a non-zero state.

To read a message in response to a message interrupt, the destination processor may read the appropriate access pointer field to identify the message length, set the access pointer field to zero to read the message from the beginning and then read the access pointer specified number of data words from the data register of the message port. Once the message data has been read, the interrupt select sub-field can be simply reset to zero. Alternately, the sub-field can be reset to a value specifying the message source processor with a zero length message has to act as an acknowledge of the receipt of a message. An acknowledge or return message can also be written to the message FIFO before setting the interrupt select sub-field to specify the source processor. In all events, the destination processor can uniquely identify the source processor by recognition of the particular message port utilized to send a message, since each message port is uniquely associated with a source processor.

A timer integrated peripheral 186 is provided to support both general purpose and special function time based operations. In a preferred embodiment of the present invention, three double word registers are presented by the timers peripheral 186 to the PIO bus 146, as detailed in Table XIII.

TABLE XIII

| Timer Source Register | Descriptions | Bit |
|---|---|---|
| Timer Reset | reset all timers | 31 |
| Count Value | sets base frequency of source clk. | [30:16] |
| Count Down | count down register | [15:0] |
| Timer 0 Register | Descriptions | Bit |
| Enable | timer enable | 31 |
| Mode | multishot/single shot mode | 19 |
| Clear Interrupt | clear interrupt timer state | 18 |
| Interrupt Select | 00 => no interrupt generated | [17:16] |
| | 01 => interrupt host CPU | |
| | 10 => interrupt DSP 1 | |
| | 11 => interrupt DSP 2 | |
| Timer Value | timer count down value | [15:0] |
| Host Latency Timer | Descriptions | Bit |
| Timer Value | timer count down value | [15:0] |

The first of these control registers provides for a 15- bit free running counter that serves a programmable time base for the other timer functions. The timer source register preferably includes a 15-bit down count field that ticks with each cycle of the system clock applied to the I/O controller 140. A 15-bit count value field stores a static base clock count value that is used to re-initialize the count-down sub-field each time the count-down sub-field reaches a value of zero. A single bit is provided as a reset control for the entire timers peripheral 186.

A general purpose timer zero register is provided to generate an interrupt on each expiration of the 16 bit count-down timer driven from the timer base clock. A timer zero register includes a 16 bit timer value that is decremented with each complete cycle of the timer base clock. A two-bit sub-field is provided to specify the processor to be interrupted on expiration of the timer zero value. Interrupt clear and timer enable bits are also provided. Finally, a mode control bit is provided to specify whether the timer zero is to act as a multi-shot timer or as a single shot timer. In the multi-shot mode, an expiration of the timer value an interrupt is generated and the timer value is reloaded. A second interrupt will only be issued only after a prior interrupt has been cleared. In single shot mode, the timer simply stops once an interrupt has been generated A specialized host interrupt latency timer is also implemented. This timer is a count-up timer driven from the timer base clock. A 16-bit timer value increments from zero beginning with the assertion of an interrupt to the host processor 12. The host interrupt latency timer is stopped and the timer value is cleared when the timer value sub-field of the host interrupt latency timer register is read. This specialized timer permits the I/O controller core 140 to support analysis typically by the host processor 12 of the effective performance of the host interrupt service routine in responding to interrupts generated by the I/O channel controller 140.

Figure 5D:
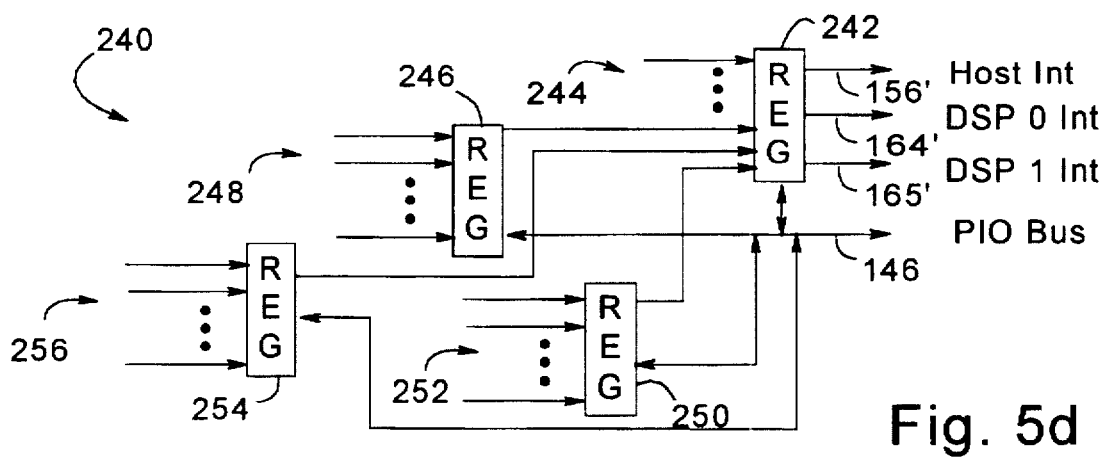
FIG. 5d is a detailed block diagram of an interrupt controller integrated peripheral of a preferred embodiment of the present invention.

Finally, an interrupt controller integrated peripheral 188 is provided to support management of the many different sources of interrupts generated by the I/O channel controller 140 during typical operation. In order to efficiently use the interrupt inputs available on the host and DSP processors, the I/O controller 140 preferably issues a single vectored interrupt to each of the processors. As shown in FIG. 5d, an interrupt register 242 generates, in the preferred embodiment, a host interrupt on line 156', a first DSP interrupt on line 164' and a second DSP interrupt on line 165'. The inputs 244 to the interrupt register 246 are received from either individual interrupt sources within the I/O controller 140 or from group interrupt registers 246, 250. The group interrupts can be read from the interrupt register 242 via the PIO bus. Table XIV provides the preferred definition of the group interrupts.

TABLE XIV

| Group Interrupt Register | Descriptions | Bit |
|---|---|---|
| Timer Mask | enable interrupt source | 12 |
| Imm. XFer Port Mask | enable interrupt source | 11 |
| Message Mask | enable interrupt source | 10 |
| Peripheral Mask | enable interrupt source | 9 |
| BTU Mask | enable interrupt source | 8 |
| Timer Interrupt | group interrupt active bit | 4 |
| Imm. XFer Port Interrupt | group interrupt active bit | 3 |
| Message Port Interrupt | group interrupt active bit | 2 |
| Peripheral Interrupt | group interrupt active bit | 1 |
| BTU Interrupt | group interrupt active bit | 0 |

Preferably, the interrupt register 242 permits each of the group interrupts to be masked. Where an interrupt group is enabled by application of the interrupt mask to generator an interrupt, the selection of a specific interrupt target 156', 164', 165', is determined by the interrupt target information provided with the group interrupt signals 244. Consequently, the individual interrupt source is determinative of the particular interrupt destination though the interrupts are grouped through the interrupt register 242.

Where a large number of interrupts may be generated by a single component of the I/O controller 140, such as the bus transfer control system 170, or where many related components can be conveniently grouped together, the interrupt request lines 248, 252 can be directed to second level group registers 246, 250. In a preferred embodiment of the present invention, a number of the integrated peripheral and peripheral interfaces 174–186 are routed through a peripheral group interrupt register 246 to provide a single group interrupt to the interrupt register 242. Internal peripherals, such as the MIDI interface 174, and external peripherals such as those provided on the DSP bus 30 can each be a source of peripheral group interrupt. Table XV provides a preferred definition of the group mask and interrupt state register accessible via the PIO bus 146.

TABLE XV

| Group Interrupt Register | Descriptions | Bit |
|---|---|---|
| Interrupt 7 Mask | enable interrupt source 7 | 15 |
| ... | ... | |
| Interrupt 1 Mask | enable interrupt source 1 | 9 |
| MIDI Mask | enable MIDI interrupt source | 8 |
| External Interrupt 7 | external interrupt 7 active bit | 7 |
| ... | ... | |
| External Interrupt 1 | external interrupt 1 active bit | 1 |
| MIDI Interrupt | peripheral interrupt active bit | 0 |

The group interrupt register 250 preferably provides a immediate port index field that reflects the interrupt state of each of the immediate transfer port interrupts. A single bit flag is used to mark whether the current readable index is valid or not. The immediate transfer port register (Table XVI) is accessible via the PIO bus 146.

TABLE XVI

| ITP Interrupt Register | Descriptions | Bit |
|---|---|---|
| ITP Index Invalid | valid/invalid flag; write to invalidate | 7 |
| ITP Index | index of ITP in ITP array | [2:0] |

Finally, a BTU group interrupt register 254 provides a control register (Table XVII) that includes a BTU index field for identifying a specific BTU that is the source of an interrupt signal 256.

TABLE XVII

| BTU Interrupt Register | Descriptions | Bit |
|---|---|---|
| BTU Index Invalid | valid/invalid flag; write to invalidate | 7 |
| Transfer Done | BTU transfer is complete | 6 |
| BTU Index | index of BTU in BTU table | [5:0] |

A separate transfer done bit is provided to signal whether the interrupt is signalling the completion of a data stream transfer. Finally, a single control bit is provided to specify whether the BTU index field is valid when read.

The interrupt controller integrated peripheral 188 thus provides a concise register system 240 for interrupting any of a number of different processors quickly in response to any of a large number of individual internal interrupts. Whenever a processor is interrupted, at most two register read operations via the PIO bus 146 are required to uniquely identify the interrupting source.

VI. Multi-Threaded Elastic Buffer FIFO Pool

Figure 6:
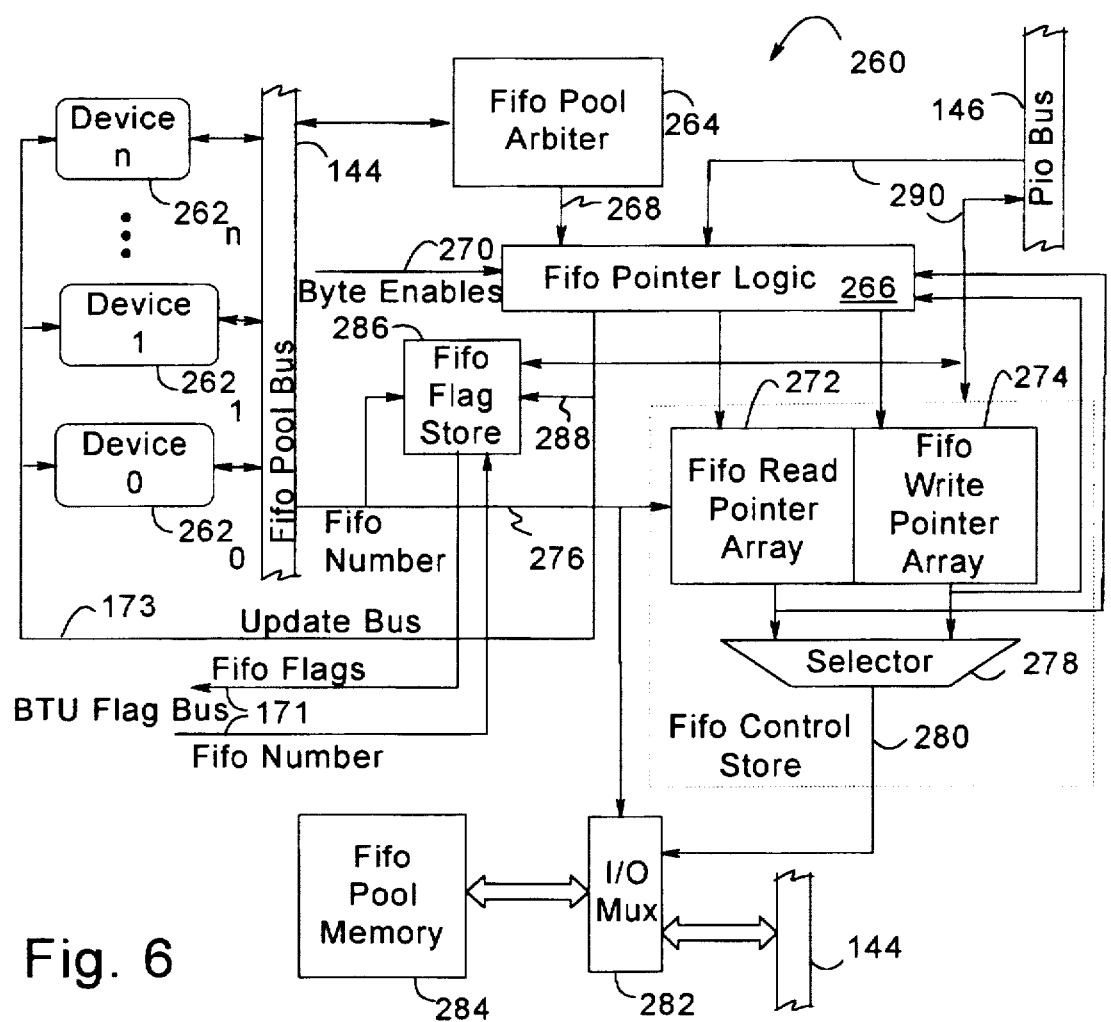
FIG. 6 is a detailed block diagram of a FIFO pool sub-system of an I/O channel controller constructed in accordance with a preferred embodiment of the present invention.

A detail view 260 of the FIFO pool 172 and the control relationship between the FIFO pool 172 and a number of FIFO access requesting devices $262_0$–$262_n$ is shown in FIG. 6. The FIFO access requesting devices $262_0$–$262_n$, preferably include the bus master interfaces 148, 150 and the integrated peripherals and peripheral interfaces 174–183. Each of the devices $262_{0-n}$ continually monitors the FIFO update bus 173 for a change in the status of any of the FIFOs assigned to a particular device $262_{0-n}$. In particular, each device $262_{0-n}$ monitors the update bus for the number of the FIFO being updated and determines whether sufficient space or data is available in the updated FIFO to support a data transfer between the device $262_{0-n}$ and the FIFO pool memory 284 via the FIFO pool bus 144.

In response to the broadcast of a qualifying status change in a FIFO assigned to a particular device $262_{0-n}$, the device $262_{0-n}$ provides an access request control signal to a FIFO arbiter 264 via the FIFO pool bus 144. During each arbitration cycle, the FIFO arbiter 264 efficiently considers only those devices $262_{0-n}$ that are requesting access to the FIFO pool 284 as uniquely represented by the set of then pending request control signals. The next device in the current arbitration cycle of the FIFO arbiter 264 is selected to have access to the FIFO pool 284. A unique acknowledge signal is returned by the FIFO arbiter 264 to the selected device $262_{0-n}$. In response, the device $262_{0-n}$ provides control signals including at least the FIFO identifier maintained by the device $262_{0-n}$ through the FIFO pool bus 144 to selector a data storage line within a FIFO flag store 286 and a FIFO control stores including a FIFO read/write pointer storage array 272; 274.

The flag store and pointer arrays 286, 272, 274 are preferably implemented as RAM register arrays having a depth equal in number to the number of FIFOs supported by the FIFO pool 284. In the preferred embodiment of the present invention, the FIFO pool provides storage for 24

16-byte deep FIFOs. Table XVIII lists the flag bit definitions for each line of the FIFO flag store 286.

TABLE XVIII

| FIFO Flags | Description | Bit |
| --- | --- | --- |
| Transfer Done | flag that transfer is complete | 12 |
| BTU Done | flag that current BTU is done | 11 |
| FIFO Size | FIFO size is greater than 16 bytes | 10 |
| Read Size | number of data bytes in FIFO | [9:4] |
| Read Byte Enables | read byte selection within FIFO | [3:2] |
| Write Byte Enables | write byte selection within FIFO | [1:0] |

The FIFO number provided on lines 276 from the FIFO pool bus 144 is used as an address to select a unique array line in the FIFO flag store 286 for use in updating the control data stored in the selected array line. The FIFO number is further used to select a corresponding array line in the FIFO read and write pointer arrays 272, 274 to enable the use of either a read or write pointer for the identified FIFO. Finally, the FIFO number on lines 276 is provided to an I/O multiplexer 282 to enable data transfer between the identified FIFO in the FIFO pool memory 284 and the FIFO pool bus 144.

The field definitions for the combined read and write pointer arrays 272, 274 are provided in Table XIX.

TABLE XIX

| FIFO R/W Pointers | Description | Bit/s |
| --- | --- | --- |
| Read Pointer | Current FIFO read location | [15:9] |
| Write Pointer | Current FIFO write location | [8:2] |
| FIFO Size | Allocated size of FIFO | [1:0] |

The size field defines the length of the FIFO. In the preferred embodiment of the present invention, a FIFO size value of "00" denotes a 16 byte FIFO depth. The value "01" specifies a 32 byte FIFO depth and a value of "10" specifies a 64 byte FIFO depth. The read and write pointers function to provide six bit FIFO byte offsets into the currently selected FIFO. The high bit in each read and write pointers, specifically the fifth bit for 16 byte FIFOs, sixth bit for 32 byte FIFOs and seventh bit for 64 byte FIFOs, is used to indicate whether a FIFO wrap-around condition exists while indexing through the FIFO.

In order to simplify allocation and management of FIFOs within the FIFO pool 284, each array line in the FIFO flag store 286 and read and write pointer arrays 272, 274 correspond to defined FIFO RAM blocks within the FIFO pool 284. Preferably, each FIFO RAM block is a 16 byte boundary aligned sequence of 16 bytes of FIFO RAM located within the FIFO pool 284. Consequently, the maximum mutual depth of the FIFO flag store 286 and read and write pointer arrays 272, 274 define the maximum number of concurrently supportable FIFOs within the FIFO pool 284. Where 32 or 64 byte long FIFOs are defined by the size field of the read and write pointer arrays 272, 274, two and four contiguous FIFO RAM blocks are utilized within the FIFO pool 284. The specification of each 32 byte FIFO or 64 byte FIFO thus necessarily preempts the independent use of one or three additional array lines.

A FIFO pointer logic unit 266 and the FIFO control store, including the read and write pointer arrays 272, 274, operate together to implement a state machine that is enabled by the FIFO arbiter 164 via an enable signal on line 268 upon selection of a device $262_{0-n}$ to participate in an access of the FIFO pool 284. The selected device $262_{0-n}$ provides its FIFO number on the lines 276 to select the corresponding FIFO read and write pointers, the active byte enables and other control information, such as data transfer direction, through the FIFO pool bus 144 to the FIFO pointer logic unit 266. The data transfer direction control signal determines whether the FIFO read or write pointer array value is provided to the I/O multiplexer 282. The byte enables define the width and alignment of the data transfer performed between the FIFO pool 284 and FIFO pool bus 144, thereby allowing independence between the data stream transfer widths of any of the devices $262_{0-n}$ that are mutually accessing a common FIFO within the FIFO pool 284.

On completion of each read or write cycle through the I/O multiplexer 282, as determined by the selected device $262_{0-n}$ via the FIFO pool bus 144, the FIFO pointer logic unit 266 updates the appropriate read or write pointer array value in the FIFO control store 272, 274. The FIFO pointer logic unit 266 also updates the corresponding line of FIFO flags in the FIFO flag store 286. In particular, the FIFO pointer logic unit 266 updates the number of bytes of data remaining in the accessed FIFO and the qualitative flags, such as transfer done and BTU done.

Once one or more bytes of data have been transferred, depending on the number of bytes immediately available to be received by or received from an internal FIFO of the selected device $262_{0-n}$ and the number of bytes available in the corresponding FIFO of the FIFO pool 284, the FIFO access request is withdrawn by the selected device $262_{0-n}$. A new arbitration cycle then begins and the FIFO pool arbiter 264 generally selects the next device $262_{0-n}$ for access to the FIFO pool 284.

The devices $262_{0-n}$ propagate a transfer done signal through the FIFO pool bus 144 to the FIFO pointer logic unit 266 to signal the termination that is sourced by or received by any of the device $262_{0-n}$. The bus master devices 148, 150 also propagate a BTU done signal whenever the current BTU is complete. In both instances, the FIFO pointer logic unit 266 handles the potentially partial FIFO data transfer that may currently remain in the corresponding internal FIFO of a participating device $262_{0-n}$ or corresponding FIFO of the FIFO pool 284.

Typically, host processor 12 based initialization and subsequent status checking of FIFO flag store 286 and the FIFO control store 272, 274 can be performed effectively through the FIFO pointer logic unit 266 subject to coordination with the FIFO pool arbiter 264. A set of programmable registers are preferably presented to the PIO bus 146 via control, FIFO index and data lines 290 that allows the current FIFO flags associated with a pool FIFO to be read by or written from the PIO bus 146.

The register presentation of the FIFO Flag array by way of the FIFO pointer logic unit is provided in Table XX.

TABLE XX

| FIFO Flags | Description | Bit/s |
| --- | --- | --- |
| FIFO Flags 0 | FIFO Flags for FIFO 0 | 16 |
| FIFO Flags 1 | FIFO Flags for FIFO 1 | 16 |
| ... | ... | ... |
| FIFO Flags 23 | FIFO Flags for FIFO 23 | 16 |

The register presentation of the FIFO control store 272, 274 effectively by way of the FIFO pointer logic unit 266 is provided in Table XXI.

TABLE XXI

| FIFO Pointers | Description | Bit/s |
| --- | --- | --- |
| FIFO Control Regs 0 | FIFO R/W Ptrs for FIFO 0 | 16 |
| FIFO Control Regs 1 | FIFO R/W Ptrs for FIFO 1 | 16 |
| ... | ... | ... |
| FIFO Control Regs 23 | FIFO R/W Ptrs for FIFO 23 | 16 |

Although both the host processor 12 and digital signal processors 32, 36 may read and write the FIFO flag and control stores 286, 272, 274, initialization, including creation and destruction of defined FIFOs within the FIFO pool 284 is preferably managed exclusively by the host processor 12. By defining the host processor 12 as the exclusive allocation manager for FIFOs within the FIFO pool 284, interlocks between the host and DSP accesses to the FIFO flag store 286 and FIFO the FIFO read and write pointer arrays 272, 274 are not required. Instead, the message port 184 may be utilized to pass short messages between the host processor 12 and DSPs 32, 36 to request and acknowledge the creation and FIFO identifier of any particular FIFO that has been newly created within the FIFO pool 284 as effectively requested by either the host processor 12 or DSPs 32, 36.

An additional feature presented by the programmability of the read and write pointer arrays 272, 274 is that FIFOs within the FIFO pool 284 can be dynamically sized as needed to ensure that data overruns and underruns are avoided. Both 64-byte and 32-byte FIFOs within the FIFO pool 284 can be shrunk in increments down to a minimum 16-byte length simply by reprogramming the size field maintained FIFO control store 272, 274. Consequently, new 16-byte and potentially 32-byte FIFOs may then be allocated within the FIFO pool 284 within the FIFO memory block or blocks no longer used by a shrunken FIFO. Conversely, FIFO lengths can be dynamically grown from 16 to 64 bytes subject to the constraints that the base FIFO RAM block is properly aligned within the FIFO pool 284, the adjacent FIFO RAM blocks are not already in use, and preferably the FIFO is empty to simplify FIFO management.

VII. Bus Transfer Unit Scan Control Logic

Figure 7:
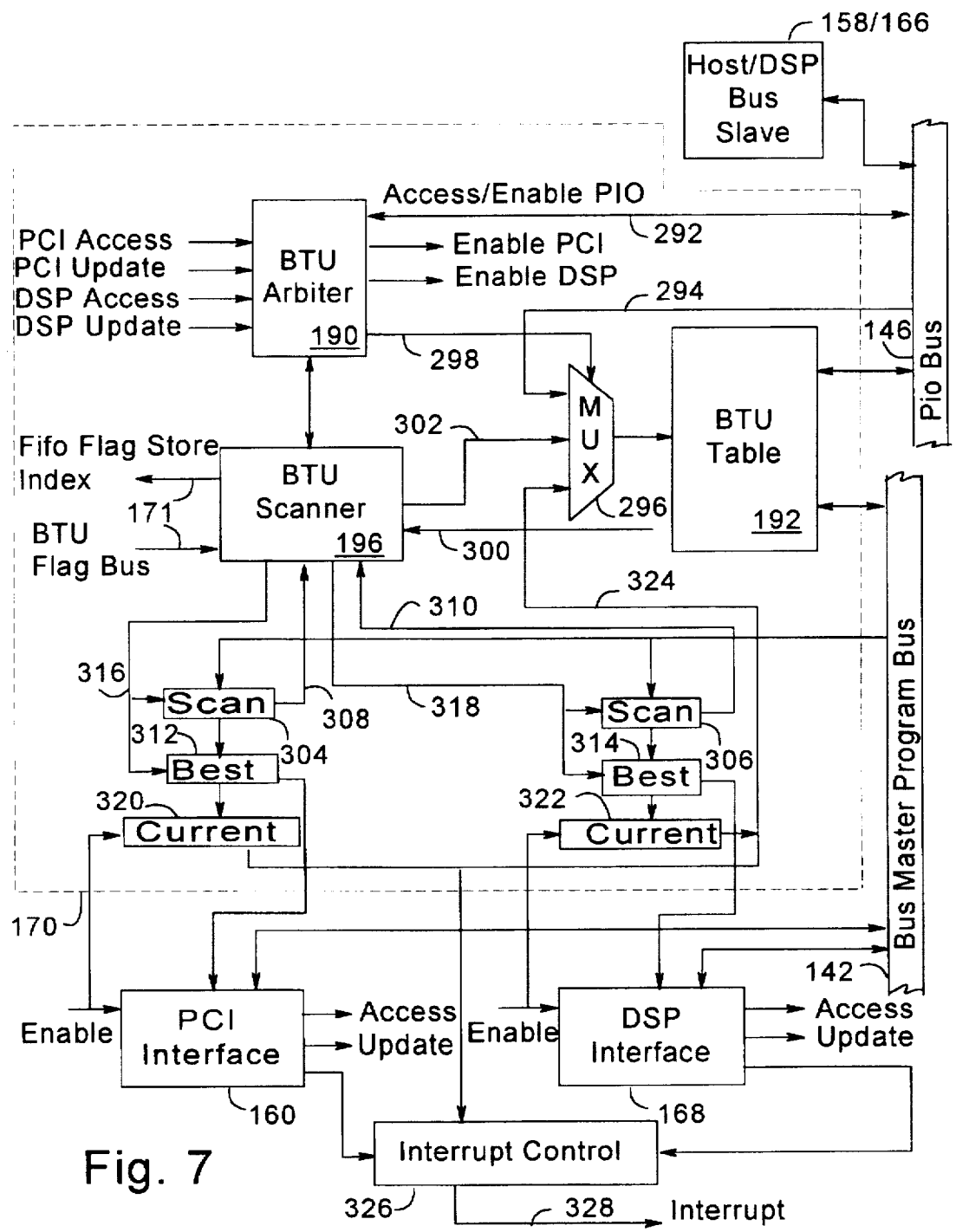
FIG. 7 is a detailed block diagram of a bus transfer unit controller sub-system of a preferred embodiment of the I/O channel controller of the present invention.

A detailed view of the bus transfer control system 170 is shown in FIG. 7. The bus transfer control system 170 operates to manage three substantially independent high priority processes that each require access to the BTU table 192. The BTU arbiter 190 serves as the primary controller for receiving access requests and selecting one of the three processes for a BTU table access. These three processes include a PCI interface transaction process, a DSP interface transaction process, and a bus slave transaction process.

The PCI interface 160 generates both access and update request to the BTU arbiter 190. An access request indicates that the PCI interface 160 is available for programming to perform a host bus master data transfer operation. An update access is requested by the PCI interface 160 to update a corresponding BTU within the BTU table 192 upon completion of a host bus master transfer. Similarly, the DSP interface 168 issues both access and update requests to the BTU arbiter 190 to request programming from a BTU in the BTU table 192 and subsequently update the BTU on completion of the DSP bus master data transfer. Finally, each of the bus slave units 158, 166 may request access to the BTU table 192 to program a new BTU or to examine the contents of a current BTU.

The BTU arbiter 190 implements a fixed priority selection mechanism with PIO bus requests having the highest priority, followed by the host and DSP bus master interfaces, and finally the BTU scanner. The BTU scanner, in turn, ensures that all BTUs have generally fair access to the BTU table 192. By operation of the PIO controller 151, the host and DSP bus slave units 158, 166 present a shared access request and receive a shared enable response from the BTU arbiter 190 via control lines in the PIO bus 146. The PIO controller determines the bus interface module 148, 150 that is enabled to respond to the enable response from the BTU arbiter 190. When an enable PIO signal is provided via the control lines 292 to the host or DSP bus slave 158, 166, a BTU index value is passed via the PIO bus 146 and address lines 294 to an address multiplexer 296. Simultaneously, the BTU arbiter 190 provides a selection signal via control line 298 to select the PIO provided index as an address selecting an entry in the BTU table 192. The host or DSP bus slave 158, 166 can then read or write the corresponding BTU within the BTU table 192.

The PCI bus master interface 160 and DSP bus master interface 168 both generate access requests to the BTU arbiter 190 whenever the interfaces are otherwise idle. The grant of a PCI or DSP access request by the BTU arbiter 190 is conditioned additionally on the identification of an available or enabled BTU defined transfer for either bus master interface 160, 168 as determined by the BTU scanner 196. The control lines 171 connecting the BTU scanner 196 with the FIFO flag array 270 provide an array index to the flag array 270 and provide for the return of at least a subset of the FIFO flags stored in the corresponding array line. Preferably, the FIFO flag array 270 is implemented as dual ported memory thereby allowing the BTU scanner 196 to continuously and largely independently scan the FIFO flag array 270 while accesses by the devices $262_{0-n}$ proceed. The dual port memory implementation of the FIFO flag array 270 provides for an appropriate access interlock that temporarily stalls the BTU scanner 196 whenever the scanner attempts to read a flag array line that is in the process of being updated by the flag manager 280. In general, scanner stalls are infrequent and brief.

The BTU scanner 196 operates to perform a qualified sequential scan of the BTU table 192 to identify a next potential BTU to be programmed for the PCI bus master interface 160 or DSP bus master interface 168. The sequential scan of the BTU scanner 196 is qualified by the state of the enable bit in each of the BTU entries within the BTU table 192. The state of these enable bits may be directly read by the BTU scanner 196 via control lines 300. The operation of the BTU scanner 196 can therefore be efficiently limited to sequentially scanning only enabled BTUs. Thus, newly created and established BTUs within the BTU table 192 are immediately included within the BTU scan while BTUs that are disabled for whatever reason are immediately excluded from the scan. When the BTU scanner 196 selects the next qualified BTU to examine, the BTU address is provided to the multiplexer 296 via BTU address lines 302. The default state of the multiplexer 296 is such that the BTU scanner provided addresses the default enabled address provided to the BTU table 192. At least a portion of the BTU is read from the BTU table 192 and stored in either of the scan registers 304, 306. The scan registers contents are presented to the BTU scanner 196 via control lines 308, 310. The BTU information, a stored by the scan registers 304, 306, is specified in Table XXII.

TABLE XXII

| Scan Register | Description | Bit/s |
|---|---|---|
| FIFO Deadlock | deadlock/irregular transfer length | 12 |
| BTU Done | best BTU done after current burst | 11 |
| Interrupt Enable | force interrupt on current BTU done | 10 |
| BTU busy | scan BTU is currently in use | 9 |
| Override | move scan BTU to best BTU reg | 8 |
| Valid for Programming | best BTU can be used for Bus Master programming; set when scanner passes the BTU index value | 7 |
| Valid | best BTU has valid BTU index | 6 |
| BTU Index | index of BTU in scan register | [5:0] |

The BTU information, as stored in the best BTU registers 312, 314, is specified in Table XXIII.

TABLE XXIII

| Best Register | Description | Bit/s |
|---|---|---|
| FIFO Byte Enables | byte selector within FIFO | [15:14] |
| Burst Length | number of bytes to transfer | [13:8] |
| Transfer Done | stream is done after best BTU burst | 7 |
| Link | program for BTU link, not transfer | 6 |
| BTU Index | index of BTU in best register | [5:0] |

The BTU information, as stored in the current BTU registers 320, 322, is specified in Table XXIV.

TABLE XXIV

| Current Register | Description | Bit/s |
|---|---|---|
| Interrupt Select | 00 => no interrupt generated<br>01 => interrupt host CPU<br>10 => interrupt DSP 1<br>11 => interrupt DSP 2 | [15:14] |
| Burst Length | number of bytes to transfer | [13:8] |
| Transfer Done | stream is done after current burst | 7 |
| Link | program BTU link, not transfer | 6 |
| BTU Index | index of BTU in best register | [5:0] |

The BTU control register is specified in Table XXV.

TABLE XXV

| Best Register | Description | Bit/s |
|---|---|---|
| Reset | reset entire BTU subsystem | 9 |
| Pulse Enable | single step the BTU scanner | 8 |
| Reserved | | [7:2] |
| Always V4P | BTUs always valid for programming | 1 |
| Enable | enable operation of BTU scanner | 0 |

Based on the information provided from the scan registers 304, 306, the BTU scanner 196 determines the particular interface 160, 168 and FIFO referenced by the BTU. The FIFO index is then applied via control lines 171 to obtain corresponding FIFO flag data from the FIFO flag array 270. Specifically, the FIFO flag data considered by the BTU scanner 196 includes whether the referenced FIFO can accommodate or presently stores sufficient data to support a bus master burst transfer. In the preferred embodiments of the present invention, each burst transfer has a maximum length of 16 bytes. However, one of the FIFO flags considered by the BTU scanner 196 is the transfer done flag that allows the BTU scanner 196 to appropriately consider enabling a burst transfer of less than 16 bytes. Also, the deadlock flag, when set, is used to force a partial data transfer rather than wait optimally for a full burst to be available. A deadlock may arise where only a partial burst is transferred due to an irregular data length transfer or possibly an error condition. The optimal transfer length of data for the participating devices is not available in the FIFO and an optimal length of data cannot be transferred to the FIFO. In any event, the device leaving a FIFO in a deadlock state will set the deadlock flag to force a short data transfer by the next device to access the FIFO.

Where the BTU scanner 196 determines that a burst data transfer can be performed through the applicable bus master interface 160, 168, a determination is then made as to whether the identified BTU has sufficient priority to be staged to either of the best BTU registers 312, 314, subject to when the BTU comes ready. BTU priority for staging is generally based on the relative least recent use of the BTU in performance of a burst data transfer. Where the BTU identified by the scan register 304, for example, has a higher priority than the BTU identified by the best BTU register 312, or if the best BTU register 312 is empty, the contents of the scan register 34 is copied down to the best BTU register 312 under the control of the BTU scanner 196 by provision of appropriate control signals via control lines 316. Conversely, if the staging priority of the BTU identified by the scan register 306 is less than that of the BTU identified by the best BTU register 314, the BTU scanner 196 does not provide for a copy down of the contents of the scan register 306 to the best BTU register 314. In either event, the BTU scanner 196 has completed a current scan cycle and proceeds to select the next qualified BTU from the BTU table 192 for potential staging toward use in controlling a bus master burst data transfer.

The BTU scanner 196 interoperates with the BTU arbiter 190 to signal whether either or both of the best BTU registers 312, 314 identify a respective BTU available for use in performing a burst data transfer. Based on this information, the BTU arbiter 190 can determine whether to provide an enable PCI or enable DSP signal to one of the interfaces 160, 168 in response to an access request. The BTU arbiter 190 signals the BTU scanner 196 when either of the enable PCI or enable DSP signals is issued by the BTU arbiter 190. The BTU scanner 196 thus may enable a bit parallel transfer of the contents of the corresponding best BTU registers 312, 314 to the corresponding current BTU register 320, 322. Concurrently, the BTU scanner 196 updates an internal BTU priority bit list that is subsequently utilized in distinguishing the relative priorities of BTUs identified in the scan and best BTU registers 304, 306, 312, 314.

The contents of an enabled best BTU register 312, 314 are provided to the corresponding PCI or DSP interface 160, 168. Concurrently, a BTU identifier is provided via address lines 324 to the multiplexer 296 for use in selecting the best BTU register identified BTU from the BTU table 192. With the issuance of the enable control signal by the BTU arbiter, a current BTU address select signal is provided via the control lines 298 to the multiplexer 296. The complete BTU is thus addressed and made available for use in programming the PCI or DSP interface 160, 168 for the performance of a burst mode data transfer. Once programmed, the PCI and DSP interfaces 160, 168 participate as any of the devices $262_{0-n}$ in requesting access to the FIFO pool 284 subject to the designated direction of the burst data transfer Where data is to be transferred to a FIFO within the FIFO pool 284, the burst data transfer is performed prior to the device 160, 168 requesting arbitrated access to the FIFO pool 284. Where the data transfer is from the FIFO pool 284, the devices 160, 168 first arbitrate to obtain data from the FIFO before performing the burst data transfer. Both the PCI and DSP interfaces maintain internal burst data FIFOs providing sufficient storage to buffer a single data burst each. In a preferred embodiment of the present invention, the PCI internal burst data FIFO is 32 bytes in depth while the DSP internal FIFO is 16 bytes.

Once the PCI or DSP interface 160, 168 has completed a bus master data transfer relative to the FIFO pool 284, the interface 160, 168 requests a PCI or DSP update. The update request to the BTU arbiter 190 is not qualified by the selection of a new BTU. Rather, the BTU identified by the contents of the current BTU registers 320, 322 are immediately utilized. Consequently, the update operation is applied to the BTU utilized to program the immediately preceding burst data transfer. With the issuance of either the enable PCI or enable DSP signals by the BTU arbiter 190, the PCI or DSP interfaces 160, 168 are enabled to write back updated information into the BTU identified by the contents of the corresponding current BTU register 320, 322. With this update, the status of the transfer done flag is effectively transferred to the referenced BTU. The equivalent flag in the FIFO flag store is also updated, though preferably in connection with the burst transfer itself. Once the BTU update has completed, the corresponding PCI or DSP interface 160, 168 again asserts an access request to the BTU arbiter 190 and awaits BTU programming.

The PCI and DSP interfaces 160, 168 may be programmed to generate interrupts in connection with the performance of a burst data transfer and potentially in response to a data transfer error. The PCI and DSP interfaces 160, 168 provide completion and error control signals to an interface interrupt controller 326. The burst completion response interrupt operation of the PCI and DSP interfaces 160, 168, as programmed into and provided from the BTU table 192 is stored in the current registers 320, 322 when the best registers 312, 314 are copied down to the current registers 320, 322. The programmed interrupt response behavior is appropriately provided from either of the current registers 320, 322 to the interface interrupt controller 326 each time the PCI or DSP interface is enabled to perform a burst data transfer. On completion of the burst data transfer or detection of an error condition, the interface interrupt controller 326 provides interrupt defining control signals, if any interrupt is to be generated, on the control lines 328 to the main interrupt controller 188.

VIII. Demand Driven Data Transfer Operations

Figure 8A:
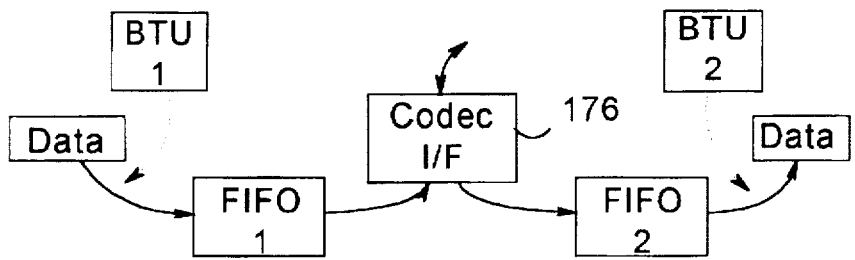
FIGS. 8a–c are control flow diagrams illustrating preferred modes of operation of an I/O channel controller based system consistent with a preferred embodiment of the present invention.
Figure 8B:
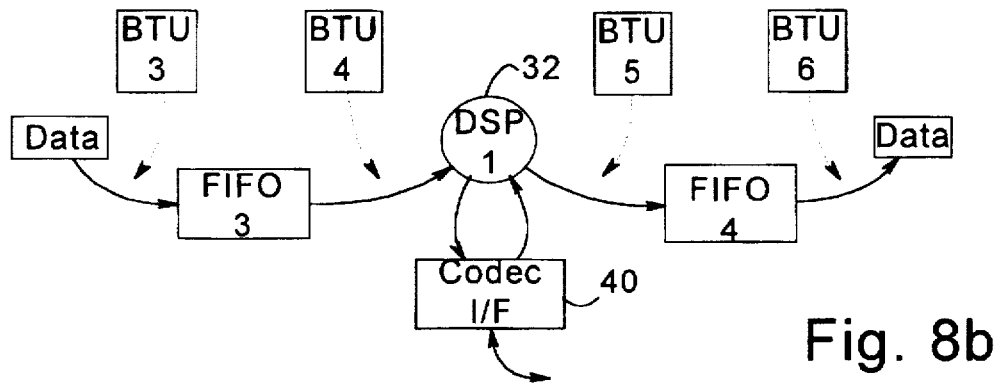
Figure 8C:
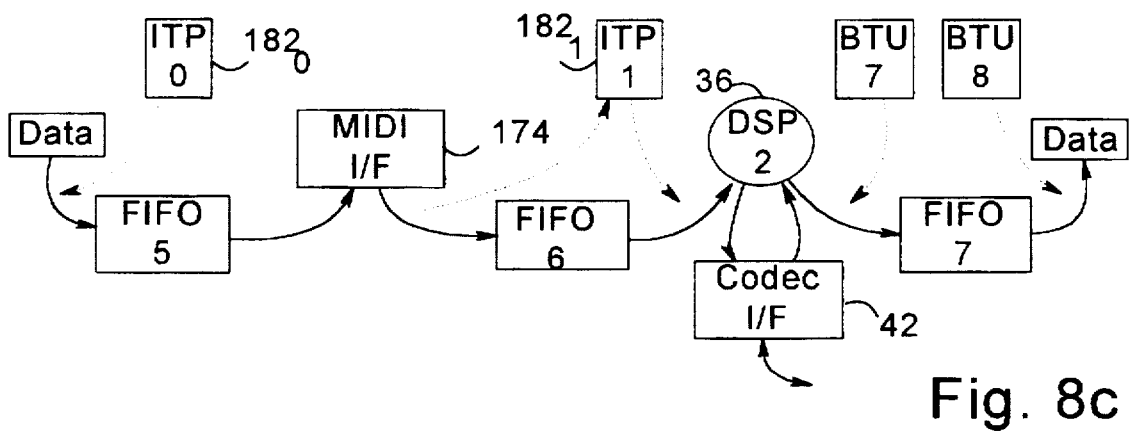

A number of exemplary data and control path examples are shown in FIGS. 8a through 8c. A logical bi-directional interface to a CODEC interface 176 is established through the use of two FIFOs and four BTUs. Since the FIFOs are independently uni-directional with respect to the transfer of data, a separate BTU is associated with each of the FIFOs to establish the management of data transfer paths.

The CODEC interface 176 operates as a consumer of data from FIFO 1. A CODEC interface 176 therefore requests access to the FIFO pool 284 at the data transfer rate established by the internal operation of the CODEC interface 176. Meanwhile, the BTU 1 participates in the scanning operation of the BTU scanner 196. As data is drawn from FIFO 1 by the CODEC interface 176, the FIFO flags are updated until sufficient room exists within FIFO 1 for a burst data transfer. BTU 1 then becomes eligible for being selected by the BTU arbiter 190 to program either the PCI interface 160 or DSP interface 166 for a burst for a burst data transfer from either system main memory 14 or DSP RAM 34 to FIFO 1 as specified by the programming of FIFO 1.

As the transfer size of BTU 1 is exhausted, a bus master data transfer may be performed through either the PCI or DSP interfaces 160, 168 to load a next sequential BTU into the BTU table 192 to maintain continuity of the data stream to the CODEC interface 176. Since the stream data may be stored as fragments in either the system main memory 14 or DSP RAM 34, chained sequences of BTUs that respectively identify the data fragments serves to efficiently implement a scatter/gather mechanism. Since the processing of the BTUs for transfer of the stream data as well as reloading chained or linked-to-BTUs is performed autonomously with respect to the host processor 12 and DSPs 32, 36, particularly in that no interrupts are necessarily generated that require servicing by the host processor 12 or DSPs 32, 36, the effective use of the host processor 12 and DSPs 32, 36 is maintained essentially independent of the ongoing operation of the I/O channel controller 22. Preferably, the last BTU in the chained sequence of BTUs controlling the transfer of the data stream to FIFO 1 is programmed to initiate an interrupt on completion of the BTU specified data transfer.

Data received from the CODEC interface 176 is demand driven into the FIFO 2 for transfer, for example, to system main memory 14. As data is received by the CODEC interface 176, the interface requests access to the FIFO pool to transfer data at a data rate consistent with the receive data rate of the CODEC interface 176. Again, as FIFO 2 fills sufficiently to qualify for a bus master transfer, the BTU 2 will be selected for the programming of the PCI interface 160 to perform a burst data transfer of data from FIFO 2 to system main memory 14.

When the data stream to or from the CODEC interface 176 to FIFO 1 or FIFO 2 terminates, the corresponding FIFO flags will be updated to reflect a transfer done status. This status will be reflected into the last chained successor BTU to BTU 1 or BTU 2. Ultimately, the transfer done will cause a FIFO reset operation to clear the FIFO. Consequently, an interrupt can be generated upon the final transfer of data to FIFO 1 or from FIFO 2.

FIG. 8b illustrates a more complex bi-directional data stream transfer involving data from system main memory 14 being transferred through a FIFO 3 to a DSP 32 to a CODEC interface 40 directly connected to the DSP 320. Since data transfers from system main memory 14 and to DSP RAM 34 are bus master transfers, two separate BTUs 3 and 4 are utilized to control the transfer of data through FIFO 3. In this example, BTU 4 is programmed into the BTU table 192 by the DSP 32 while the BTU 3 is programmed by the host processor 12. Since the DSP 32 is responsible for managing a data destination section of the RAM 34 pointed to by BTU 4, the DSP 32 may establish the BTU 4 and chained successors to specify the transfer of corresponding blocks of data of desired size and cause the generation of an interrupt as the transfer of each or only the last block of data to the DSP RAM 34 is completed. Meanwhile, the BTU 3 and chained successors become active in the operation of the bus transfer control system 170 as adequate room in FIFO 3 becomes available for data burst transfer. Preferably, when the last data burst transfer to FIFO 3 is performed, the chained successor BTU to BTU 3 will specify the generation of an interrupt to the host processor 12. Alternately, the host processor 12 may send a simple message through the message port 184 to the DSP 32 to specify that the data stream transfer is complete on the final emptying of the FIFO 3.

Data received by the DSP 32 from the CODEC interface 40 may be processed by the digital signal processor 32 and then stored in a buffer location within the RAM 34. Once a block of data has been established in the DSP RAM 34, a BTU 5 may be programmed by the DSP 32 into the BTU table 192. Shortly after being enabled, BTU 5 will be used to program burst data transfers from the DSP RAM 34 to FIFO 4. As FIFO 4 fills sufficiently to support a burst data transfer, a BTU 6 pre-established by the host processor 12 will qualify for arbitration selection to program the PCI bus master interface 160 to perform a burst transfer of data to system main memory 14 at the address specified by BTU 6 or a chained successor BTU. To terminate the data stream, the DSP 32 could transfer a message through the message port 184 to the host processor 12 specifying the total amount of data that is to be transferred. A final BTU may then be established by the host processor 12 reflecting the total expected amount of data remaining and to generate an interrupt once that data has been transferred to system main memory 14. Preferably, however, the DSP 32 instead directs the DSP bus master unit 150 to propagate a transfer done signal in connection with the transfer of the current and final portion of the stream data.

A more complex example is shown in FIG. 8c. A MIDI interface 174 is connected through a FIFO 5 to receive data from system main memory 14. The host processor 12 preferably utilizes an immediate transfer port $182_0$ to provide data into the FIFO 5. Since the timing of the outbound MIDI data transfer stream is managed by the host processor 12 itself, the immediate transfer port $182_0$ is used by the host processor 12 to passively provide data to the FIFO 5. The use is passive in that no interrupt is generated in response to the placement of data into the FIFO 5. Rather, the MIDI interface 174 is established to request a FIFO pool access whenever data is present in the corresponding FIFO 5. In general, the latency in completing the data transfer from the FIFO 5 to the MIDI interface 174 is minimal and adequately uniform in view of the normal data rates of a MIDI device. Consequently, unlike the demand driven operation of other data transfers managed through the I/O channel controller core 26 of the present invention, the rate of data provided outbound through the MIDI interface 174 is source rather than demand driven.

Data originating or inbound from the MIDI interface 174 is provided directly to a FIFO 6 effectively at the receipt data rate established by the MIDI interface 174. As each byte or word of data is received through the interface 174, a request is immediately placed to transfer the data to a corresponding FIFO in the FIFO pool 186. Again, in general, the latency in completing the data transfer to the FIFO 6 from the MIDI interface 174 is minimal and adequately uniform in view of the normal data rates of a MIDI device.

A second immediate transfer port $182_1$ is preferably established to actively generate an interrupt to, in this instance, a DSP 36 each time inbound MIDI data is placed in the FIFO 6. In response to the interrupt, the DSP 36 retrieves the data from the FIFO 6 through the immediate transfer port $182_1$, records a corresponding time stamp, and stores both in the DSP RAM 34. Consequently, the DSP 36 can efficiently receive, time stamp, and process data received from the MIDI interface 174 with a minimum, substantially fixed latency. Although the immediate transfer port $182_1$ will generate a significant number of DSP interrupts, the read rate of MIDI data transfer is fairly low and the DSP 36 is typically fairly efficient in servicing interrupts. In any event, the entire processing overhead of these MIDI related interrupts is isolated to the DSP 36 and shielded from both the host processor 12 and any other DSP 32. The resultant data processing load on the DSP 36 can be selected so that any concurrent processing of data to be provided to or received from a directly connected CODEC interface 42 relative to the DSP RAM 34 is within the data processing capability of the DSP 36.

Finally, data received and processed by the DSP 36 may be transferred through, for example, the CODEC interface 42 for further processing, or through a FIFO 7 to system main memory 14 subject to the mutual control of BTUs 8 and 9, or both.

The processes described above in regard to FIGS. 8a–c, in accordance with the present invention, may be and typically are mutually independent of one another. Each of the processes can represent an independent data stream being transferred subject to an independent control thread between the host processor 12 and the data sources and sinks associated with the I/O channel controller 22. The present invention, however, specifically enables these and potentially other process to proceed concurrently. Furthermore, due to the demand driven operation of each of the streams, the utilization of the I/O channel controller 22 is fairly allocated on a dynamic and continuing basis to ensure that the fundamental data transfer rate of each stream meets the needs of the peripheral data source or sink.

IX. Summary

Thus, a multifunction I/O peripheral support system has been described. The peripheral system provides for substantially autonomously operating, multi-threaded data stream transfers that are particularly matched to the demanded I/O bandwidth of the integrated and external peripheral devices connected to the peripheral system. In addition, the peripheral system provides memory to memory data transfer support for multiple digital signal processors that can be utilized off-load processing and interrupt intensive tasks from the host processor while, at the same time, minimizing and directly supporting the overhead placed on the host processor in management of the Digital Signal Processors.

In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

We claim:

1. A bus transfer control system for managing the transfer of multiple continuous asynchronous data streams, said bus transfer control system comprising:

a) a buffer pool, definable as a plurality of memory buffers, capable of storing a plurality of data stream segments representing one or more data streams;

b) a plurality of data transfer devices coupled to said buffer pool and to a plurality of memory spaces, said data transfer devices supporting the iterative transfer of data stream segments between said memory buffers and said memory spaces, said data transfer devices providing requests for data stream segment transfers in response to the accessibility of said memory spaces to receive and provide data stream segments; and c) a transfer controller, responsive to said requests and providing storage for status information as bus transfer units that define respective data streams, said transfer controller iteratively scanning said bus transfer units to select a first bus transfer unit and enable the transfer of a first predetermined data stream segment between said buffer pool and a first data transfer device specified by said first bus transfer unit in a predetermined scan iteration.

2. The bus transfer control system of claim 1 wherein said first data transfer device obtains a first predetermined portion of said status information stored by said first bus transfer unit by obtaining programming from said transfer controller, said first data transfer device updating said first predetermined portion of said status information upon transfer of said first predetermined segment of said first predetermined data stream between said buffer pool and a first memory space.

3. The bus transfer control system of claim 2 wherein said plurality of data transfer devices includes a second data transfer device coupleable to a second memory space and responsive to the access availability of said second memory space and wherein said second data transfer device obtains a second predetermined portion of said status information stored by a second bus transfer unit by obtaining programming from said transfer controller, said second data transfer device updating said second predetermined portion of said status information upon transfer of a second predetermined segment of a second predetermined data stream between said buffer pool and said second memory space.

4. The bus transfer control system of claim 3 wherein said first and second predetermined data streams are the same data stream.

5. The bus transfer control system of claim 3 or 4 wherein said status information is stored as a plurality of bus transfer units in a bus transfer table and includes prioritization and memory buffer information and wherein said transfer controller is coupled to said bus transfer table for iteratively selecting highest priority first and second bus transfer units for respective use by said first and second data transfer devices.

6. The bus transfer control system of claim 5 wherein said transfer controller maintains respective identifiers of said first and second bus transfer units for use in updating said first and second bus transfer units independent of a next iteration of selecting said highest priority first and second bus transfer units for respective use by said first and second data transfer devices.

7. A bus master data transfer control system for transferring data segments of multiple continuous transfer data streams between a memory accessible by said bus master data transfer control system over an arbitrated access data transfer bus and a buffer pool, said bus master data transfer control system comprising:

a) a buffer pool providing for the storage of a plurality of data packets;

b) a first bus master unit coupleable to a first arbitrated access data transfer bus that provides access to a first external memory space, said first bus master unit providing for the transfer of a first predetermined data packet between said first arbitrated access data transfer bus and a first bus master data packet buffer and between said first bus master data packet buffer and said buffer pool;

c) a second bus master unit coupleable to an second arbitrated access data transfer bus that provides access to a second external memory space, said second bus master unit providing for the transfer of a second predetermined data packet between said second arbitrated access data transfer bus and a second bus master data packet buffer and between said second bus master data packet buffer and said buffer pool; and d) a bus transfer controller, responsive to the data segment present statuses of said first and second bus master data packet buffers, including a table for storing bus transfer control units including first and second predetermined bus transfer control units that respectively determine bus master data transfers by said first and second bus master units relative to said buffer pool, said bus transfer controller iteratively operative to select a prioritized bus transfer control unit from said table to enable a bus data transfer relative to said buffer pool.

8. The bus master data transfer control system of claim 7 wherein said first and second predetermined bus transfer control units are programmatically associated with said first and second bus master units and a predetermined memory block of said buffer pool.

9. The bus master data transfer control system of claim 8 further comprising an arbiter system for selecting either of said first and second bus transfer control units for use in programming a respective one of said first and second bus master units for the transfer of said first and second predetermined data packets.

10. The bus master data transfer control system of claim 9 wherein said bus transfer controller manages the transfer of said first and second data packets through said buffer pool and wherein said arbiter system is coupled to said bus transfer controller for determining the selection of said first and second bus transfer control units.

11. The bus master data transfer control system of claim 10 wherein said first and second predetermined data packets represent individual data packets within a first stream of data packets, and wherein a third bus transfer control unit stored in said table specifies a third bus master data transfer of a third predetermined data packet of a second stream of data packets.

12. An I/O channel controller supporting the asynchronous transfer of a plurality of continuous transfer data streams between a memory and a plurality of I/O interface units, said I/O channel controller comprising:

a) a FIFO pool buffer including a plurality of dynamically allocable FIFO buffers through which streams of data are asynchronously transferred;

b) a plurality of I/O interface units; and c) a transfer control unit providing for the storage of one or more transfer control data units, said transfer control unit autonomously monitoring the amount of data buffered by any of said dynamically allocable FIFO buffers relative to a predetermined threshold amount and for selectively initiating the transfer of portions of said streams of data as defined by respective ones of said transfer control data units between said memory and said FIFO pool buffer.

* * * * *